(12) United States Patent
Wu et al.

(10) Patent No.: US 11,709,342 B2
(45) Date of Patent: Jul. 25, 2023

(54) OPTICAL IMAGING LENS ASSEMBLY, IMAGE CAPTURING UNIT AND ELECTRONIC DEVICE

(71) Applicant: LARGAN PRECISION CO., LTD., Taichung (TW)

(72) Inventors: Chien-Hsun Wu, Taichung (TW); Chun-Che Hsueh, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 408 days.

(21) Appl. No.: 16/993,128

(22) Filed: Aug. 13, 2020

(65) Prior Publication Data

US 2020/0371318 A1    Nov. 26, 2020

Related U.S. Application Data

(63) Continuation of application No. 15/867,469, filed on Jan. 10, 2018, now Pat. No. 10,782,506.

(30) Foreign Application Priority Data

Oct. 27, 2017  (TW) .................. 106137100

(51) Int. Cl.
  *G02B 3/02*  (2006.01)
  *G02B 13/18* (2006.01)
  *G02B 13/00* (2006.01)
  *G02B 9/62*  (2006.01)
  *G02B 13/06* (2006.01)

(52) U.S. Cl.
  CPC .......... *G02B 13/0045* (2013.01); *G02B 9/62* (2013.01); *G02B 13/06* (2013.01)

(58) Field of Classification Search
  CPC ....... G02B 9/62; G02B 13/0045; G02B 13/06
  USPC .................................. 359/642–830
  See application file for complete search history.

(56) References Cited

U.S. PATENT DOCUMENTS

2014/0078605 A1* 3/2014 Ohashi ............... G02B 13/0045
                                          359/754
2014/0240851 A1* 8/2014 Kawamura ............. G02B 9/64
                                          359/708

(Continued)

FOREIGN PATENT DOCUMENTS

CN    106443969 A    2/2017
TW    M527550 U     8/2016

*Primary Examiner* — Mahidere S Sahle
(74) *Attorney, Agent, or Firm* — Maschoff Brennan

(57) ABSTRACT

An optical imaging lens assembly includes, in order from an object side to an image side: a first, a second, a third, a fourth, a fifth and a sixth lens elements. The first lens element has negative refractive power. The second lens element has an object-side surface being concave in a paraxial region thereof. The third lens element has an object-side surface being convex in a paraxial region thereof. The fifth lens element with negative refractive power has an object-side surface being concave and an image-side surface being convex in a paraxial region thereof. The sixth lens element has an image-side surface being concave in a paraxial region thereof. At least one of an object-side surface and the image-side surface of the sixth lens element has at least one critical point in an off-axis region thereof, wherein both the surfaces of the sixth lens element are aspheric.

19 Claims, 25 Drawing Sheets

(56) References Cited

U.S. PATENT DOCUMENTS

| | | | |
|---|---|---|---|
| 2015/0062407 A1* | 3/2015 | Chen | G02B 13/0045 |
| | | | 348/335 |
| 2015/0207998 A1* | 7/2015 | Lin | H04N 5/23296 |
| | | | 359/713 |
| 2018/0074290 A1 | 3/2018 | Chang et al. | |
| 2018/0074291 A1 | 3/2018 | Chang et al. | |

* cited by examiner

OPTICAL IMAGING LENS ASSEMBLY, IMAGE CAPTURING UNIT AND ELECTRONIC DEVICE

RELATED APPLICATIONS

This application is a continuation patent application of U.S. application Ser. No. 15/867,469 filed on Jan. 10, 2018, which claims priority to Taiwan Application 106137100, filed on Oct. 27, 2017, which is incorporated by reference herein in its entirety.

BACKGROUND

Technical Field

The present disclosure relates to an optical imaging lens assembly, an image capturing unit and an electronic device, more particularly to an optical imaging lens assembly and an image capturing unit applicable to an electronic device.

Description of Related Art

In recent years, with the popularity of electronic devices having camera functionalities, the demand for miniaturized optical systems has been increasing. As advanced semiconductor manufacturing technologies have reduced the pixel size of image sensors, and compact optical systems have gradually evolved toward the field of higher megapixels, there is an increasing demand for compact optical systems featuring better image quality.

For various applications, the optical systems have been widely applied to different kinds of electronic devices, such as vehicle devices, image recognition systems, entertainment devices, sport devices and intelligent home systems. Furthermore, in order to provide better user experience, electronic devices equipped with one or more optical systems have become the mainstream products on the market, and the optical systems are developed with various optical features according to different requirements.

As the size of electronic devices getting smaller and smaller, it is difficult for conventional optical systems, to meet the requirements of high-end specification and compact size, especially requirements such as a large aperture or a wide field of view. Generally, in order to achieve compactness, a first lens element of a miniaturized optical system usually has positive refractive power, and a second lens element usually has negative refractive power. However, it is difficult for light from a large field of view to travel into the miniaturized optical system due to strong positive refractive power of the first lens element, thereby failing to achieve a wide angle configuration. On the other hand, a conventional wide-angle optical system usually has a first lens element with negative refractive power for gathering light from the large field of view. However, the total track length of the wide-angle optical system is increased due to the negative refractive power of the first lens element, thereby unable to achieve compactness. Therefore, there is a need to develop an optical system featuring wide field of view and compact size while having a first lens element with negative refractive power.

SUMMARY

According to one aspect of the present disclosure, an optical imaging lens assembly includes six lens elements. The six lens elements are, in order from an object side to an image side, a first lens element, a second lens element, a third lens element, a fourth lens element, a fifth lens element and a sixth lens element. The first lens element has negative refractive power. The second lens element has an object-side surface being concave in a paraxial region thereof. The third lens element has an object-side surface being convex in a paraxial region thereof. The fifth lens element with negative refractive power has an object-side surface being concave in a paraxial region thereof and an image-side surface being convex in a paraxial region thereof. The sixth lens element has an image-side surface being concave in a paraxial region thereof. At least one of an object-side surface and the image-side surface of the sixth lens element has at least one critical point in an off-axis region thereof, and the object-side surface and the image-side surface of the sixth lens element are both aspheric. When a focal length of the optical imaging lens assembly is f, and a curvature radius of the image-side surface of the fifth lens element is R10, the following condition is satisfied:

$$f/R10 < -0.65.$$

According to another aspect of the present disclosure, an image capturing unit includes the aforementioned optical imaging lens assembly and an image sensor, wherein the image sensor is disposed on an image surface of the optical imaging lens assembly.

According to still another aspect of the present disclosure, an electronic device includes the aforementioned image capturing unit.

According to yet another aspect of the present disclosure, an optical imaging lens assembly includes six lens elements. The six lens elements are, in order from an object side to an image side, a first lens element, a second lens element, a third lens element, a fourth lens element, a fifth lens element and a sixth lens element. The first lens element has negative refractive power. The second lens element has an object-side surface being concave in a paraxial region thereof and an image-side surface being convex in a paraxial region thereof. The third lens element has an object-side surface being convex in a paraxial region thereof. The fifth lens element has negative refractive power. The sixth lens element has an image-side surface being concave in a paraxial region thereof. At least one of an object-side surface and the image-side surface of the sixth lens element has at least one critical point in an off-axis region thereof, and the object-side surface and the image-side surface of the sixth lens element are both aspheric. When a curvature radius of the object-side surface of the third lens element is R5, and a curvature radius of an image-side surface of the third lens element is R6, the following condition is satisfied:

$$(R5+R6)/(R5-R6) < 0.20.$$

According to yet still another aspect of the present disclosure, an optical imaging lens assembly includes six lens elements. The six lens elements are, in order from an object side to an image side, a first lens element, a second lens element, a third lens element, a fourth lens element, a fifth lens element and a sixth lens element. The first lens element has negative refractive power. The second lens element has an object-side surface being concave in a paraxial region thereof. The third lens element has an object-side surface being convex in a paraxial region thereof and an image-side surface being concave in a paraxial region thereof. The fifth lens element has negative refractive power. The sixth lens element has an image-side surface being concave in a paraxial region thereof. At least one of an object-side surface and the image-side surface of the sixth lens element has at least one critical point in an off-axis region thereof, and the object-side surface and the image-side surface of the sixth lens element are both aspheric.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
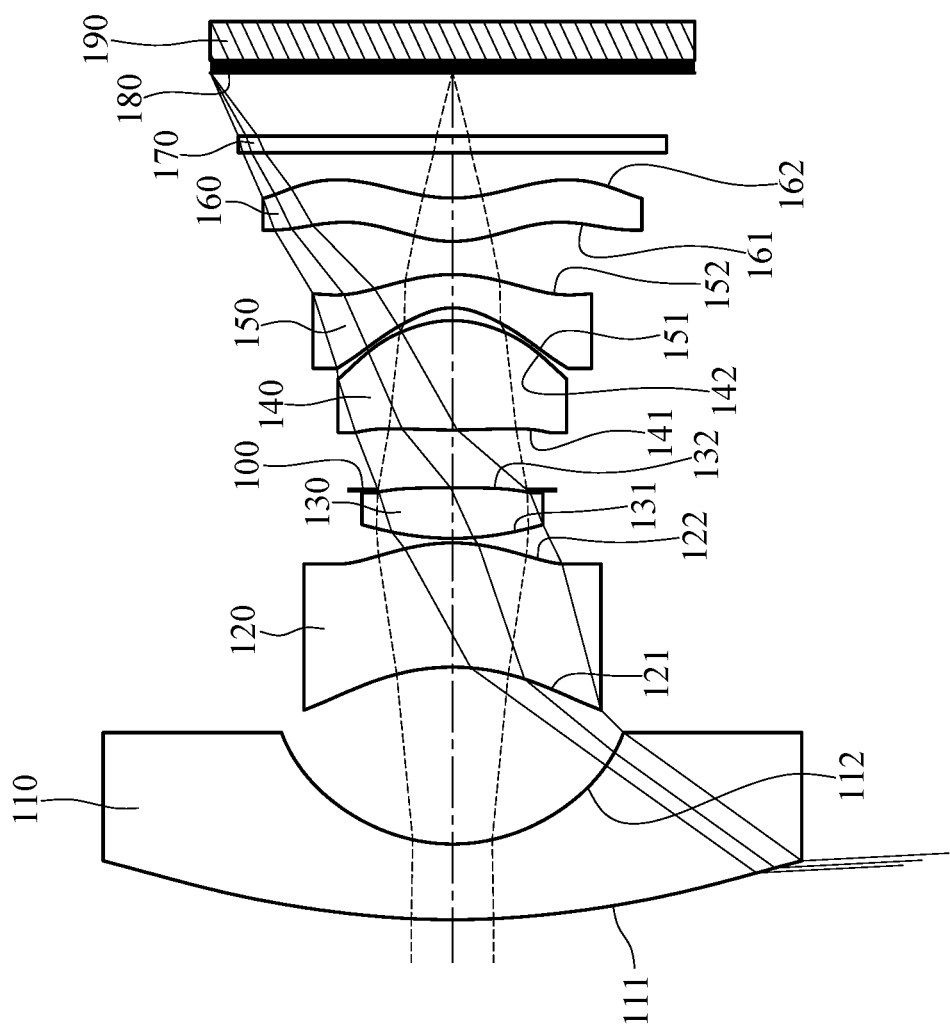
FIG. 1 is a schematic view of an image capturing unit according to the 1st embodiment of the present disclosure.

An optical imaging lens assembly includes six lens elements. The six lens elements are, in order from an object side to an image side, a first lens element, a second lens element, a third lens element, a fourth lens element, a fifth lens element and a sixth lens element.

The first lens element has negative refractive power. Therefore, it is favorable for providing the optical imaging lens assembly with a wide-angle lens configuration to gather light from a large field of view.

The second lens element has an object-side surface being concave in a paraxial region thereof, and the second lens element can have an image-side surface being convex in a paraxial region thereof. Therefore, it is favorable for correcting aberrations generated by the first lens element so as to improve the image quality.

The third lens element can have positive refractive power; therefore, it is favorable for the optical imaging lens assembly to gather light from the large field of view. The third lens element has an object-side surface being convex in a paraxial region thereof, and the third lens element can have an image-side surface being concave in a paraxial region thereof; therefore, it is favorable for a shape of the third lens element configured with a shape of the second lens element so as to prevent a total track length of the optical imaging lens assembly from being overly long due to the first lens element having negative refractive power, and for correcting aberrations generated by the first lens element so as to further improve the image quality. The image-side surface of the third lens element can have at least one convex critical point in an off-axis region thereof; therefore, it is favorable for correcting astigmatism and field curvature in the off-axis region.

The fourth lens element can have positive refractive power. Therefore, it is favorable for properly distributing the positive refractive power on the third lens element and the fourth lens element so as to reduce the sensitivity of the optical imaging lens assembly.

The fifth lens element has negative refractive power; therefore, it is favorable for balancing the positive refractive power of the fourth lens element and correcting chromatic aberration. The fifth lens element can have an object-side surface being concave in a paraxial region thereof and an image-side surface being convex in a paraxial region thereof; therefore, it is favorable for correcting astigmatism so as to improve the image quality. The image-side surface of the fifth lens element can have at least one concave critical point in an off-axis region thereof; therefore, it is favorable for correcting off-axis aberrations so as to further improve the image quality.

The sixth lens element has an image-side surface being concave in a paraxial region thereof, and at least one of an object-side surface and the image-side surface of the sixth lens element has at least one critical point in an off-axis region thereof. Therefore, it is favorable for correcting the Petzval sum so as to flatten an image surface while correcting off-axis aberrations.

When a focal length of the optical imaging lens assembly is f, and a curvature radius of the image-side surface of the fifth lens element is R10, the following condition can be satisfied: f/R10<−0.65. Therefore, it is favorable for strengthening the negative refractive power of the fifth lens element for correcting aberrations so as to improve peripheral image quality and increase relative illuminance on the periphery of the image surface; furthermore, it is favorable for ensuring a proper ratio of a central thickness to a peripheral thickness of the fifth lens element so as to avoid molding and assembling problems. Preferably, the following condition can be satisfied: $-3.0<f/R10<-0.80$. More preferably, the following condition can also be satisfied: $-3.0<f/R10<-1.0$.

When a curvature radius of the object-side surface of the third lens element is R5, and a curvature radius of the image-side surface of the third lens element is R6, the following condition can be satisfied: $(R5+R6)/(R5-R6)<0.20$. Therefore, it is favorable for light from the large field of view to travel into the optical imaging lens assembly and converge onto the image surface. Preferably, the following condition can be satisfied: $-4.5<(R5+R6)/(R5-R6)<-0.40$. More preferably, the following condition can also be satisfied: $-3.0<(R5+R6)/(R5-R6)<-1.0$.

When an f-number of the optical imaging lens assembly is Fno, the following condition can be satisfied: $1.20<Fno<2.40$. Therefore, it is favorable for providing a large aperture stop so as to capture sufficient image data in lowlight (e.g., night-time) or short exposure (e.g., dynamic photography) conditions; furthermore, it is favorable for increasing imaging speed so as to achieve high image quality in a well-lit condition.

When a maximum field of view of the optical imaging lens assembly is FOV, the following condition can be satisfied: $110 [deg.]<FOV<220 [deg.]$. Therefore, it is favorable for obtaining a wide angle effect.

When a sum of axial distances between every adjacent lens elements of the optical imaging lens assembly is $\Sigma AT$, and an axial distance between the first lens element and the second lens element is T12, the following condition can be satisfied: $1.0<\Sigma AT/T12<2.75$. Therefore, it is favorable for obtaining a tight arrangement of the lens elements and better fitting with one another so as to increase manufacturing yield. Preferably, the following condition can also be satisfied: $1.0<\Sigma AT/T12<2.0$.

When a central thickness of the second lens element is CT2, and a central thickness of the third lens element is CT3, the following condition can be satisfied: $1.0<CT2/CT3$. Therefore, it is favorable for preventing the third lens element from being overly thick and overly small space between the third lens element and its adjacent lens elements.

According to the present disclosure, an absolute value of a curvature radius of the object-side surface of the fifth lens element is the smallest among absolute values of curvature radii of all lens surfaces of the six lens elements. That is, among the absolute values of the curvature radii of object-side surfaces and image-side surfaces of the first through the sixth lens elements, the absolute value of the curvature radius of the object-side surface of the fifth lens element is the smallest. Therefore, it is favorable for the object-side surface of the fifth lens element to have a proper curvature radius so as to provide sufficient negative refractive power for correcting aberrations, and further reduce the total track length of the optical imaging lens assembly.

When the focal length of the optical imaging lens assembly is f, and a curvature radius of the image-side surface of the sixth lens element is R12, the following condition can be satisfied: $0.75<f/R12$. Therefore, it is favorable for reducing a back focal length of the optical imaging lens assembly so as to be applicable to compact devices.

When an Abbe number of the fifth lens element is V5, and an Abbe number of the sixth lens element is V6, the following condition can be satisfied: $V5+V6<65$. Therefore, it is favorable for obtaining a balance between correction of chromatic aberration and correction of astigmatism.

Figure 25:
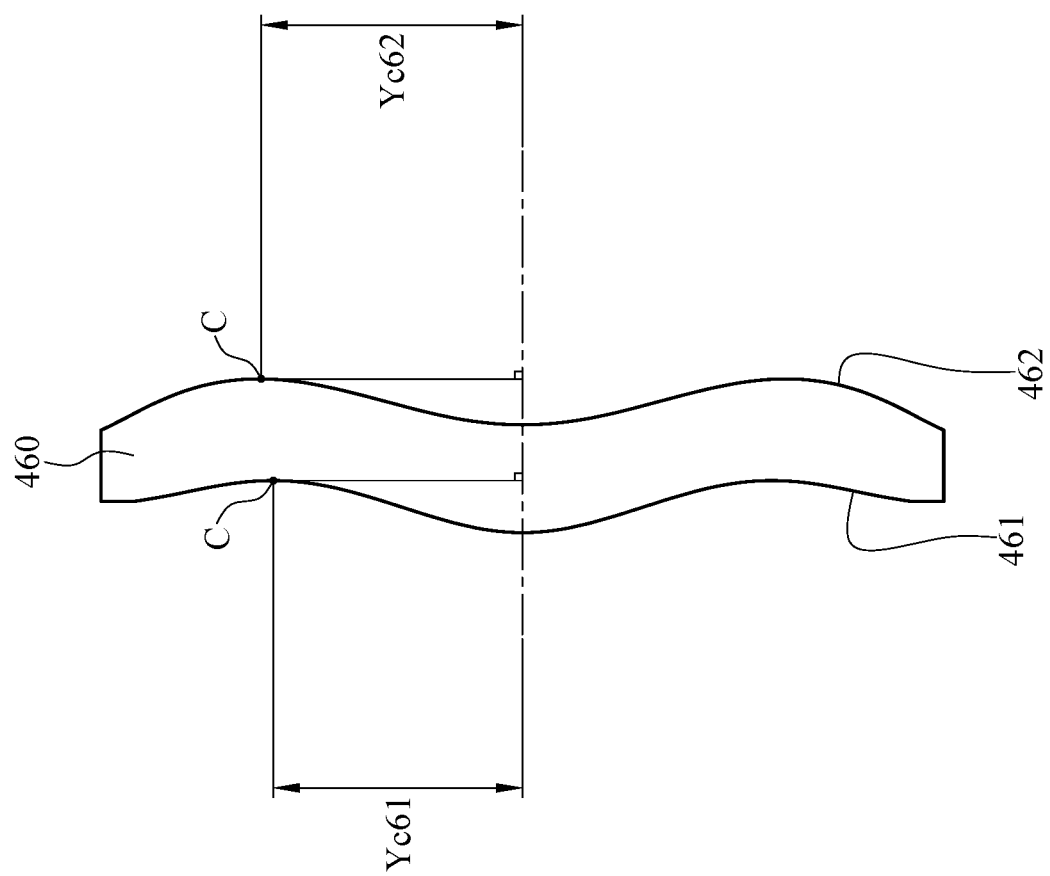
FIG. 25 shows a schematic view of Yc61, Yc62 and critical points on an object-side surface and an image-side surface of a sixth lens element, according to the 4th embodiment of the present disclosure.

When a vertical distance between a non-axial critical point on the object-side surface of the sixth lens element and an optical axis is Yc61, and a vertical distance between a non-axial critical point on the image-side surface of the sixth lens element and the optical axis is Yc62, the following condition can be satisfied: $0.50<Yc61/Yc62<2.0$. Therefore, it is favorable for correcting off-axis aberrations with improved peripheral image quality so as to obtain a wide angle effect and high quality images. Please refer to FIG. 25, which shows a schematic view of Yc61, Yc62 and critical points C on the object-side surface and the image-side surface of the sixth lens according to the 4th embodiment of the present disclosure. When the object-side surface or the image-side surface of the sixth lens element has a single critical point, Yc61 or Y62 is a vertical distance between that single critical point and the optical axis. When the object-side surface or the image-side surface of the sixth lens element has a plurality of critical points, Yc61 or Y62 can be a vertical distance between the critical point closest to the optical axis of the plurality of critical points and the optical axis.

When a curvature radius of the object-side surface of the sixth lens element is R11, the curvature radius of the image-side surface of the sixth lens element is R12, and a central thickness of the sixth lens element is CT6, the following condition can be satisfied: $|R11/CT6|+|R12/CT6|<10$. Therefore, it is favorable for reducing the back focal length of the optical imaging lens assembly so as to be applicable to miniaturized electronic devices.

When the focal length of the optical imaging lens assembly is f, a curvature radius of the object-side surface of the second lens element is R3, and a curvature radius of the image-side surface of the second lens element is R4, the following condition can be satisfied: $0.60<|f/R3|+|f/R4|<3.0$. Therefore, it is favorable for obtaining the proper shape of the second lens element corresponding to the first lens element so as to prevent surface reflection in the off-axis region and ensure light converging onto the image surface.

According to the present disclosure, the aforementioned features and conditions can be utilized in numerous combinations so as to achieve corresponding effects.

According to the present disclosure, the lens elements of the optical imaging lens assembly can be made of either glass or plastic material. When the lens elements are made of glass material, the refractive power distribution of the optical imaging lens assembly may be more flexible. The glass lens element can either be made by grinding or molding. When the lens elements are made of plastic material, the manufacturing cost can be effectively reduced. Furthermore, surfaces of each lens element can be arranged to be aspheric, which allows for more controllable variables for eliminating the aberration thereof, the required number of the lens elements can be decreased, and the total track length of the optical imaging lens assembly can be effectively reduced. The aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise specified, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, a critical point is a non-axial point of the lens surface where its tangent is perpendicular to the optical axis.

According to the present disclosure, an image surface of the optical imaging lens assembly, based on the corresponding image sensor, can be flat or curved, especially a curved surface being concave facing towards the object side of the optical imaging lens assembly.

According to the present disclosure, an image correction unit, such as a field flattener, can be optionally disposed between the lens element closest to the image side of the optical imaging lens assembly and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the specification of an image capturing unit. In general, a preferable image correction unit is, for example, a thin transparent element having a concave object-side surface and a planar image-side surface, and the thin transparent element is disposed near the image surface.

According to the present disclosure, the optical imaging lens assembly can include at least one stop, such as an aperture stop, a glare stop or a field stop. Said glare stop or said field stop is set for eliminating the stray light and thereby improving the image quality thereof.

According to the present disclosure, an aperture stop can be configured as a front stop or a middle stop. A front stop disposed between an imaged object and the first lens element can provide a longer distance between an exit pupil of the optical imaging lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the optical imaging lens assembly and thereby provides a wider field of view for the same.

According to the above description of the present disclosure, the following specific embodiments are provided for further explanation.

1st Embodiment

Figure 2:
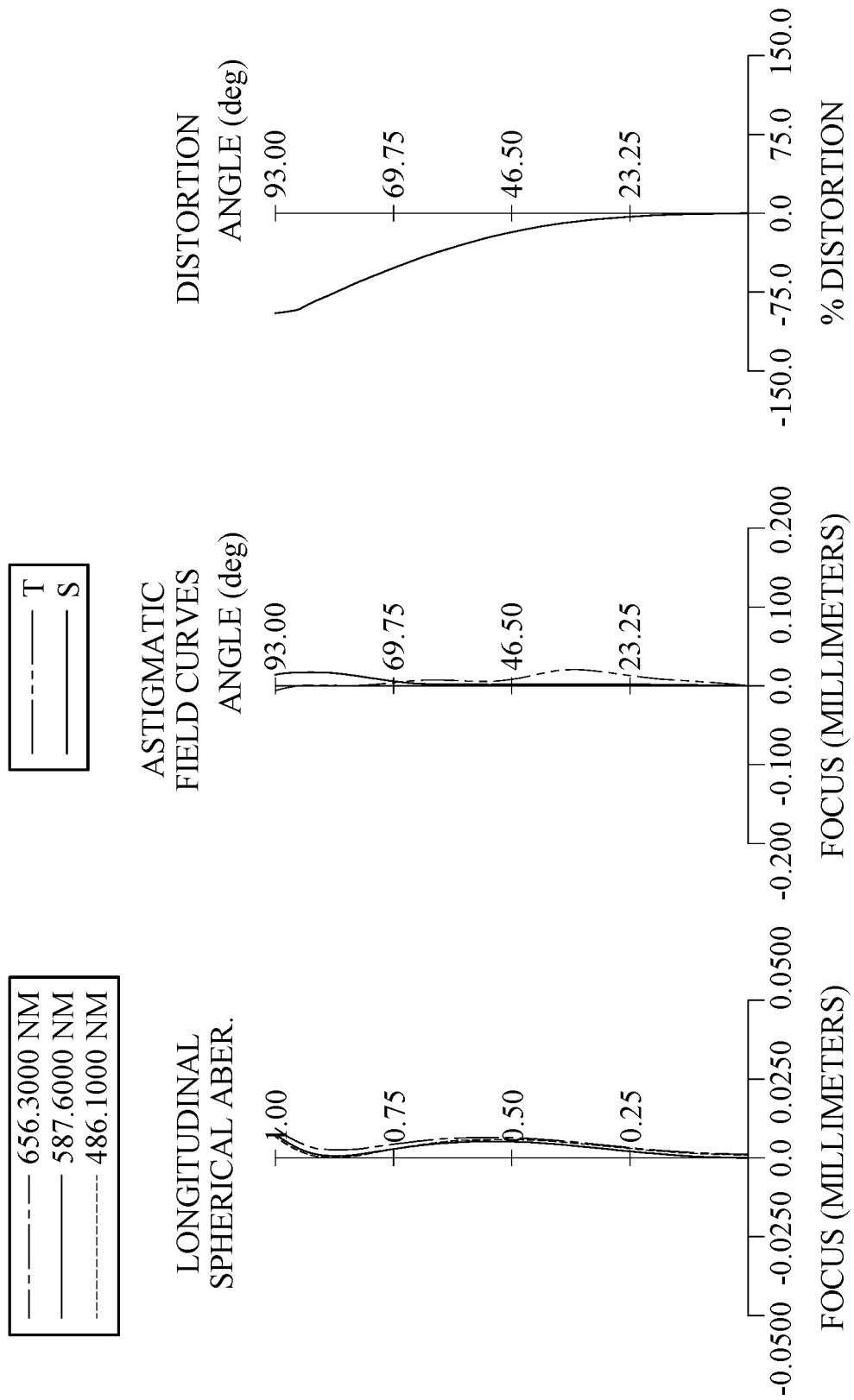
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the optical imaging lens assembly (its reference numeral is omitted) of the present disclosure and an image sensor 190. The optical imaging lens assembly includes, in order from an object side to an image side, a first lens element 110, a second lens element 120, a third lens element 130, an aperture stop 100, a fourth lens element 140, a fifth lens element 150, a sixth lens element 160, an IR-cut filter 170 and an image surface 180. The optical imaging lens assembly includes six lens elements (110, 120, 130, 140, 150 and 160) with no additional lens element disposed between each of the adjacent six lens elements.

The first lens element 110 with negative refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with positive refractive power has an object-side surface 121 being concave in a paraxial region thereof and an image-side surface 122 being convex in a paraxial region thereof. The second lens element 120 is made of plastic material and has the object-side surface 121 and the image-side surface 122 being both aspheric.

The third lens element 130 with positive refractive power has an object-side surface 131 being convex in a paraxial region thereof and an image-side surface 132 being planar in a paraxial region thereof. The third lens element 130 is made of plastic material and has the object-side surface 131 and the image-side surface 132 being both aspheric.

The fourth lens element 140 with positive refractive power has an object-side surface 141 being convex in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with negative refractive power has an object-side surface 151 being concave in a paraxial region thereof and an image-side surface 152 being convex in a paraxial region thereof. The fifth lens element 150 is made of plastic material and has the object-side surface 151 and the image-side surface 152 being both aspheric. The image-side surface 152 of the fifth lens element 150 has at least one concave critical point in an off-axis region thereof.

The sixth lens element 160 with positive refractive power has an object-side surface 161 being convex in a paraxial region thereof and an image-side surface 162 being concave in a paraxial region thereof. The sixth lens element 160 is made of plastic material and has the object-side surface 161 and the image-side surface 162 being both aspheric. Each of the object-side surface 161 and the image-side surface 162 of the sixth lens element 160 has at least one critical point in an off-axis region thereof.

The IR-cut filter 170 is made of glass material and located between the sixth lens element 160 and the image surface 180, and will not affect the focal length of the optical imaging lens assembly. The image sensor 190 is disposed on or near the image surface 180 of the optical imaging lens assembly.

In this embodiment, an absolute value of a curvature radius of the object-side surface 151 of the fifth lens element 150 is smaller than the absolute values of the curvature radii of the other lens surfaces of the six lens elements. In detail, the absolute value of the curvature radius of the object-side surface 151 of the fifth lens element 150 is 0.396.

The equation of the aspheric surface profiles of the aforementioned lens elements of the 1st embodiment is expressed as follows:

$$X(Y) = (Y^2/R)/(1 + \text{sqrt}(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10 and 12.

In the optical imaging lens assembly of the image capturing unit according to the 1st embodiment, when a focal length of the optical imaging lens assembly is f, an f-number of the optical imaging lens assembly is Fno, and half of a maximum field of view of the optical imaging lens assembly is HFOV, these parameters have the following values: f=1.11 millimeters (mm), Fno=2.05, HFOV=93.0 degrees (deg.).

When the maximum field of view of the optical imaging lens assembly is FOV, the following condition is satisfied: FOV=186.0 degrees.

When an Abbe number of the fifth lens element 150 is V5, and an Abbe number of the sixth lens element 160 is V6, the following condition is satisfied: V5+V6=45.42.

When a curvature radius of the object-side surface 131 of the third lens element 130 is R5, and a curvature radius of the image-side surface 132 of the third lens element 130 is R6, the following condition is satisfied: (R5+R6)/(R5−R6)=−1.00.

When the focal length of the optical imaging lens assembly is f, a curvature radius of the object-side surface 121 of the second lens element 120 is R3, and a curvature radius of the image-side surface 122 of the second lens element 120 is R4, the following condition is satisfied: |f/R3|+|f/R4|=1.70.

When the focal length of the optical imaging lens assembly is f, and a curvature radius of the image-side surface 152 of the fifth lens element 150 is R10, the following condition is satisfied: f/R10=−1.06.

When the focal length of the optical imaging lens assembly is f, and a curvature radius of the image-side surface 162 of the sixth lens element 160 is R12, the following condition is satisfied: f/R12=1.07.

When a curvature radius of the object-side surface 161 of the sixth lens element 160 is R11, the curvature radius of the image-side surface 162 of the sixth lens element 160 is R12, and a central thickness of the sixth lens element 160 is CT6, the following condition is satisfied: |R11/CT6|+|R12/CT6|=6.30.

When a central thickness of the second lens element 120 is CT2, and a central thickness of the third lens element 130 is CT3, the following condition is satisfied: CT2/CT3=2.46.

When a sum of axial distances between every adjacent lens elements of the optical imaging lens assembly is ΣAT, and an axial distance between the first lens element 110 and the second lens element 120 is T12, the following condition is satisfied: ΣAT/T12=1.61. In this embodiment, the axial distance between two adjacent lens elements is the air gap in a paraxial region between the two adjacent lens elements.

When a vertical distance between a non-axial critical point on the object-side surface 161 of the sixth lens element 160 and an optical axis is Yc61, and a vertical distance between a non-axial critical point on the image-side surface 162 of the sixth lens element 160 and the optical axis is Yc62, the following condition is satisfied: Yc61/Yc62=0.94.

The detailed optical data of the 1st embodiment are shown in Table 1 and the aspheric surface data are shown in Table 2 below.

TABLE 1

1st Embodiment
f = 1.11 mm, Fno = 2.05, HFOV = 93.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 5.553 | (ASP) | 0.500 | Plastic | 1.544 | 56.0 | −2.91 |
| 2 | | 1.194 | (ASP) | 1.170 | | | | |
| 3 | Lens 2 | −1.479 | (ASP) | 0.822 | Plastic | 1.544 | 56.0 | 5.35 |
| 4 | | −1.173 | (ASP) | 0.030 | | | | |
| 5 | Lens 3 | 1.902 | (ASP) | 0.334 | Plastic | 1.544 | 56.0 | 3.50 |
| 6 | | ∞ | (ASP) | −0.014 | | | | |
| 7 | Ape. Stop | Plano | | 0.397 | | | | |
| 8 | Lens 4 | 4.835 | (ASP) | 0.724 | Plastic | 1.544 | 56.0 | 1.13 |
| 6 | | −0.669 | (ASP) | 0.084 | | | | |
| 10 | Lens 5 | −0.396 | (ASP) | 0.220 | Plastic | 1.669 | 19.5 | −1.10 |
| 11 | | −1.045 | (ASP) | 0.219 | | | | |
| 12 | Lens 6 | 0.769 | (ASP) | 0.287 | Plastic | 1.614 | 26.0 | 3.42 |
| 13 | | 1.040 | (ASP) | 0.300 | | | | |
| 14 | IR-cut filter | Plano | | 0.110 | Glass | 1.517 | 64.2 | — |
| 15 | | Plano | | 0.418 | | | | |
| 16 | Image | Plano | | — | | | | |

Note:
Reference wavelength is 587.6 nm (d-line).

TABLE 2

Aspheric Coefficients

| Surface # | 1 | 2 | 3 | 4 | 5 | 6 |
|---|---|---|---|---|---|---|
| k = | 4.4599E−01 | 6.4654E−03 | −1.1494E+00 | −2.0909E−01 | 3.2530E+00 | 4.9995E+01 |
| A4 = | −1.2559E−02 | −3.6443E−02 | −9.4149E−02 | 3.5427E−01 | −9.3235E−02 | −6.4321E−01 |
| A6 = | 4.7427E−03 | −1.9591E−02 | 2.3356E−01 | −4.9639E−02 | 7.9119E−02 | 1.0114E+00 |
| A8 = | −9.2299E−04 | 1.4576E−02 | −1.1329E−01 | 4.3835E−03 | −5.3597E−01 | −2.1290E+00 |
| A10 = | 6.0087E−05 | −5.0800E−03 | 1.4218E−02 | 3.4971E−01 | — | 2.2313E+00 |

| Surface # | 8 | 9 | 10 | 11 | 12 | 13 |
|---|---|---|---|---|---|---|
| k = | −1.7021E+01 | −1.8708E+00 | −2.8471E+00 | −2.9989E+00 | −5.9180E+00 | −1.8050E+00 |
| A4 = | −3.1452E−01 | 8.9294E−01 | 3.5799E−01 | 4.3030E−01 | −1.8396E−01 | −5.0354E−01 |
| A6 = | 5.9901E−01 | −5.6508E+00 | −3.4393E+00 | −1.1851E+00 | −5.3496E−01 | 1.8531E−01 |
| A8 = | −3.5390E+00 | 1.0786E+01 | 7.7025E+00 | 3.0389E+00 | 8.6247E−01 | 2.0132E−02 |
| A10 = | 4.7185E+00 | −8.5099E+00 | −4.5509E+00 | −3.1218E+00 | −4.5645E−01 | −4.7658E−02 |
| A12 = | — | 2.6487E+00 | −9.8354E−01 | 1.0612E+00 | 8.5658E−02 | 1.6223E−02 |

In Table 1, the curvature radius, the thickness and the focal length are shown in millimeters (mm). Surface numbers 0-16 represent the surfaces sequentially arranged from the object side to the image side along the optical axis. In Table 2, k represents the conic coefficient of the equation of the aspheric surface profiles. A4-A12 represent the aspheric coefficients ranging from the 4th order to the 12th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
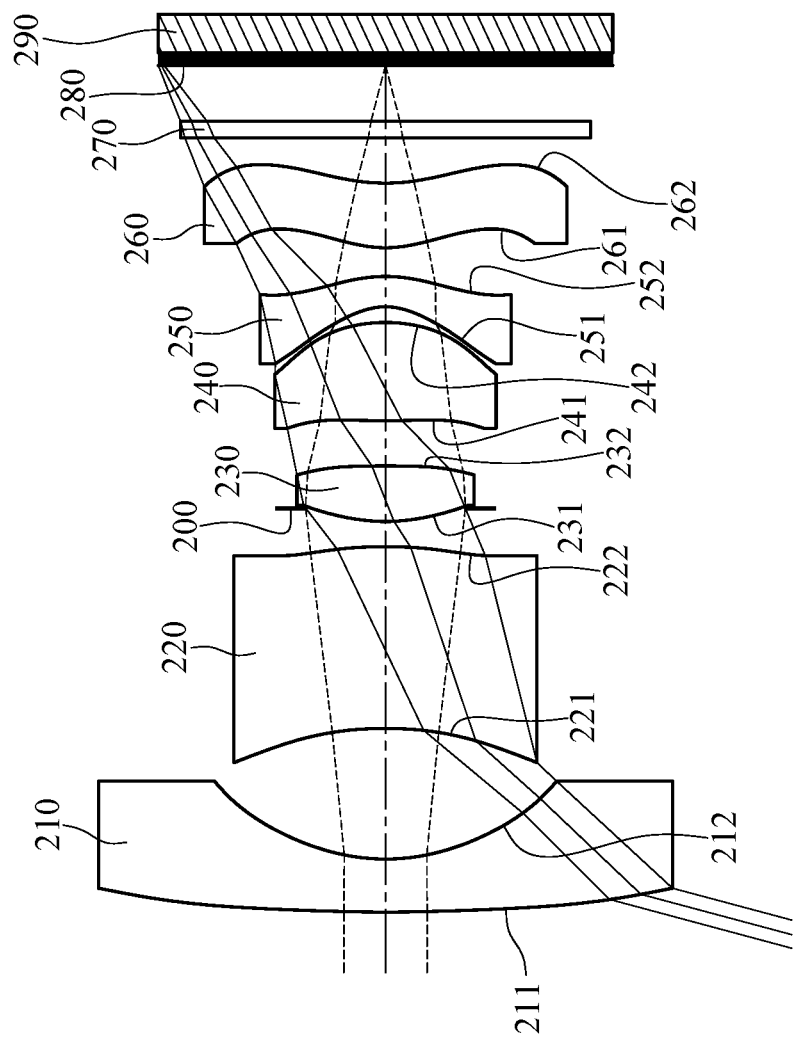
FIG. 3 is a schematic view of an image capturing unit according to the 2nd embodiment of the present disclosure.
Figure 4:
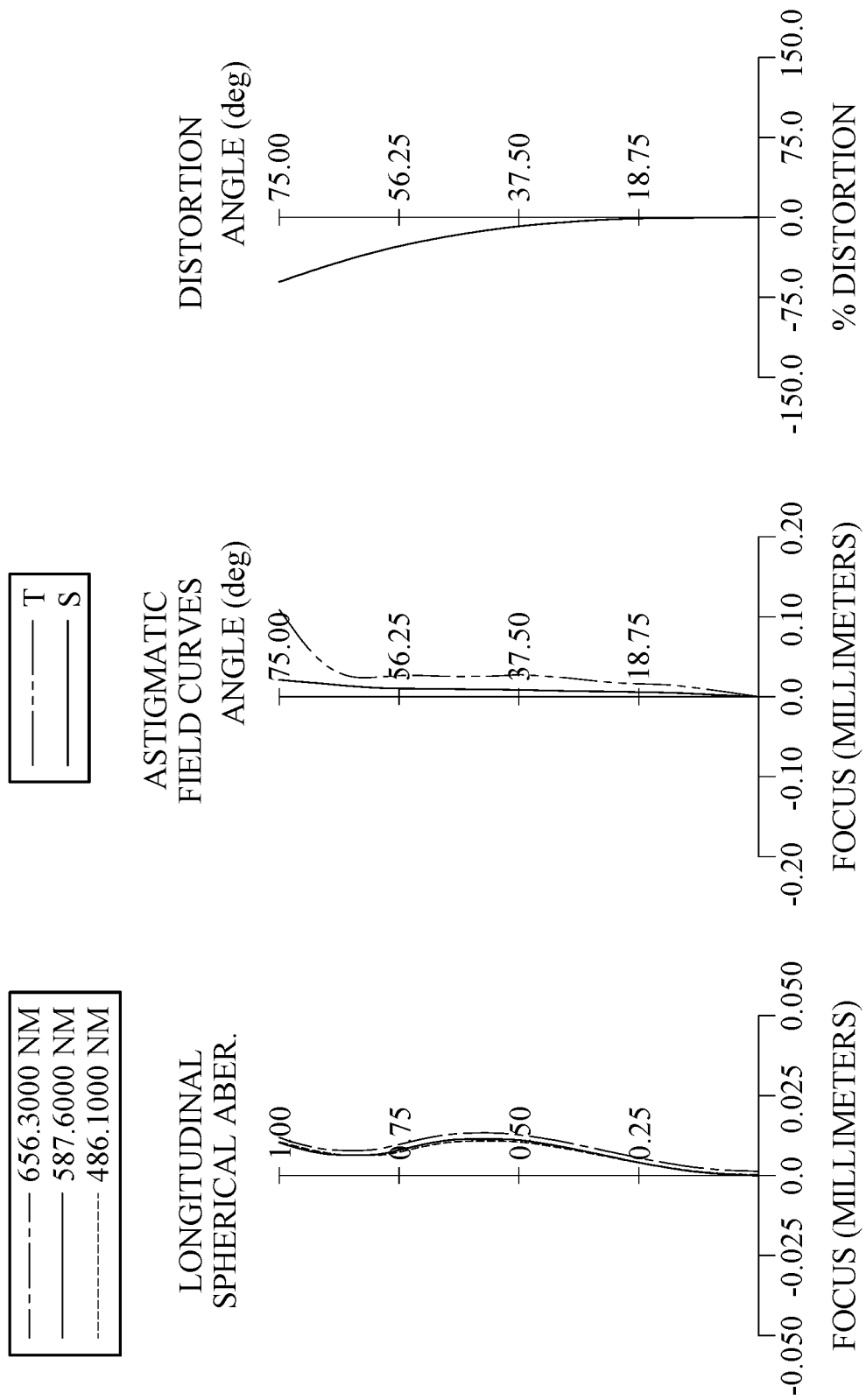
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the optical imaging lens assembly (its reference numeral is omitted) of the present disclosure and an image sensor 290. The optical imaging lens assembly includes, in order from an object side to an image side, a first lens element 210, a second lens element 220, an aperture stop 200, a third lens element 230, a fourth lens element 240, a fifth lens element 250, a sixth lens element 260, an IR-cut filter 270 and an image surface 280. The optical imaging lens assembly includes six lens elements (210, 220, 230, 240, 250 and 260) with no additional lens element disposed between each of the adjacent six lens elements.

The first lens element 210 with negative refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric.

The second lens element 220 with negative refractive power has an object-side surface 221 being concave in a paraxial region thereof and an image-side surface 222 being convex in a paraxial region thereof. The second lens element 220 is made of plastic material and has the object-side surface 221 and the image-side surface 222 being both aspheric.

The third lens element 230 with positive refractive power has an object-side surface 231 being convex in a paraxial region thereof and an image-side surface 232 being convex in a paraxial region thereof. The third lens element 230 is made of plastic material and has the object-side surface 231 and the image-side surface 232 being both aspheric.

The fourth lens element 240 with positive refractive power has an object-side surface 241 being convex in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with negative refractive power has an object-side surface 251 being concave in a paraxial region thereof and an image-side surface 252 being convex in a paraxial region thereof. The fifth lens element 250 is made of plastic material and has the object-side surface 251 and the image-side surface 252 being both aspheric. The image-side surface 252 of the fifth lens element 250 has at least one concave critical point in an off-axis region thereof.

The sixth lens element 260 with positive refractive power has an object-side surface 261 being convex in a paraxial region thereof and an image-side surface 262 being concave in a paraxial region thereof. The sixth lens element 260 is made of plastic material and has the object-side surface 261 and the image-side surface 262 being both aspheric. Each of the object-side surface 261 and the image-side surface 262 of the sixth lens element 260 has at least one critical point in an off-axis region thereof.

The IR-cut filter 270 is made of glass material and located between the sixth lens element 260 and the image surface 280, and will not affect the focal length of the optical imaging lens assembly. The image sensor 290 is disposed on or near the image surface 280 of the optical imaging lens assembly.

In this embodiment, an absolute value of a curvature radius of the object-side surface 251 of the fifth lens element 250 is smaller than the absolute values of the curvature radii of the other lens surfaces of the six lens elements. In detail, the absolute value of the curvature radius of the object-side surface 251 of the fifth lens element 250 is 0.421.

The detailed optical data of the 2nd embodiment are shown in Table 3 and the aspheric surface data are shown in Table 4 below.

TABLE 3

2nd Embodiment
f = 1.09 mm, Fno = 1.98, HFOV = 75.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 10.719 | (ASP) | 0.350 | Plastic | 1.534 | 55.9 | −2.83 |
| 2 | | 1.310 | (ASP) | 0.865 | | | | |
| 3 | Lens 2 | −2.437 | (ASP) | 1.202 | Plastic | 1.582 | 30.2 | −66.00 |
| 4 | | −3.074 | (ASP) | 0.254 | | | | |
| 5 | Ape. Stop | Plano | | −0.088 | | | | |
| 6 | Lens 3 | 1.176 | (ASP) | 0.368 | Plastic | 1.544 | 55.9 | 2.00 |
| 7 | | −12.848 | (ASP) | 0.299 | | | | |
| 8 | Lens 4 | 4.957 | (ASP) | 0.650 | Plastic | 1.544 | 55.9 | 1.61 |
| 9 | | −1.014 | (ASP) | 0.103 | | | | |
| 10 | Lens 5 | −0.421 | (ASP) | 0.201 | Plastic | 1.669 | 19.5 | −1.33 |
| 11 | | −0.956 | (ASP) | 0.190 | | | | |
| 12 | Lens 6 | 0.770 | (ASP) | 0.427 | Plastic | 1.544 | 55.9 | 2.84 |
| 13 | | 1.236 | (ASP) | 0.300 | | | | |
| 14 | IR-cut filter | Plano | | 0.110 | Glass | 1.517 | — | — |
| 15 | | Plano | | 0.369 | | | | |
| 16 | Image | Plano | | — | | | | |

Note:
Reference wavelength is 587.6 nm (d-line).

TABLE 4

Aspheric Coefficients

| Surface # | 1 | 2 | 3 |
|---|---|---|---|
| k = | 9.1950E+00 | −8.9629E−01 | 2.8837E−01 |
| A4 = | −3.5589E−02 | −8.2833E−02 | −1.1542E−01 |
| A6 = | 3.2885E−02 | 1.9605E−01 | 1.6821E−01 |
| A8 = | −1.5866E−02 | −5.2708E−01 | −6.4855E−02 |
| A10 = | 5.0481E−03 | 1.0502E+00 | 3.2295E−03 |
| A12 = | −1.0391E−03 | −1.1565E+00 | — |
| A14 = | 1.1782E−04 | 6.6948E−01 | — |
| A16 = | −5.2419E−06 | −1.5742E−01 | — |

| Surface # | 4 | 6 | 7 |
|---|---|---|---|
| k = | 1.4782E+01 | 1.9997E+00 | −8.7110E+01 |
| A4 = | −1.9359E−01 | −6.8819E−01 | −6.3498E−01 |
| A6 = | 1.4174E+00 | 9.8622E−01 | 7.8736E−01 |
| A8 = | −2.4006E+00 | −1.9695E+00 | −9.6320E−01 |
| A10 = | 2.5639E+00 | — | 1.9687E+00 |
| A12 = | — | — | — |
| A14 = | — | — | — |
| A16 = | — | — | — |

| Surface # | 8 | 9 | 10 |
|---|---|---|---|
| k = | −3.8588E+01 | −7.6453E−01 | −2.8341E+00 |
| A4 = | −5.8682E−01 | −1.3642E−01 | −4.1443E−01 |
| A6 = | 5.1959E−01 | −2.0219E+00 | 2.5905E+00 |
| A8 = | −2.3135E+00 | 4.6302E+00 | −1.2451E+01 |
| A10 = | 3.8574E+00 | −1.9707E+00 | 2.7465E+01 |
| A12 = | — | −6.9199E−01 | −2.0582E+01 |

| Surface # | 11 | 12 | 13 |
|---|---|---|---|
| k = | −5.0191E+00 | −7.3968E+00 | −1.0984E+00 |
| A4 = | −5.6598E−02 | −5.4853E−02 | −3.5622E−01 |
| A6 = | 2.4689E+00 | −9.3338E−01 | −9.2861E−02 |
| A8 = | −7.2367E+00 | 1.8448E+00 | 3.9195E−01 |
| A10 = | 9.3877E+00 | −1.7425E+00 | −3.2862E−01 |
| A12 = | −4.5509E+00 | 6.1040E−01 | 8.6527E−02 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 1.09 | f/R10 | −1.14 |
| Fno | 1.98 | f/R12 | 0.88 |
| HFOV [deg.] | 75.0 | |R11/CT6| + |R12/CT6| | 4.70 |
| FOV [deg.] | 150.0 | CT2/CT3 | 3.27 |
| V5 + V6 | 75.39 | ΣAT/T12 | 1.88 |
| (R5 + R6)/(R5 − R6) | −0.83 | Yc61/Yc62 | 0.85 |
| |f/R3| + |f/R4| | 0.80 | — | — |

3rd Embodiment

Figure 5:
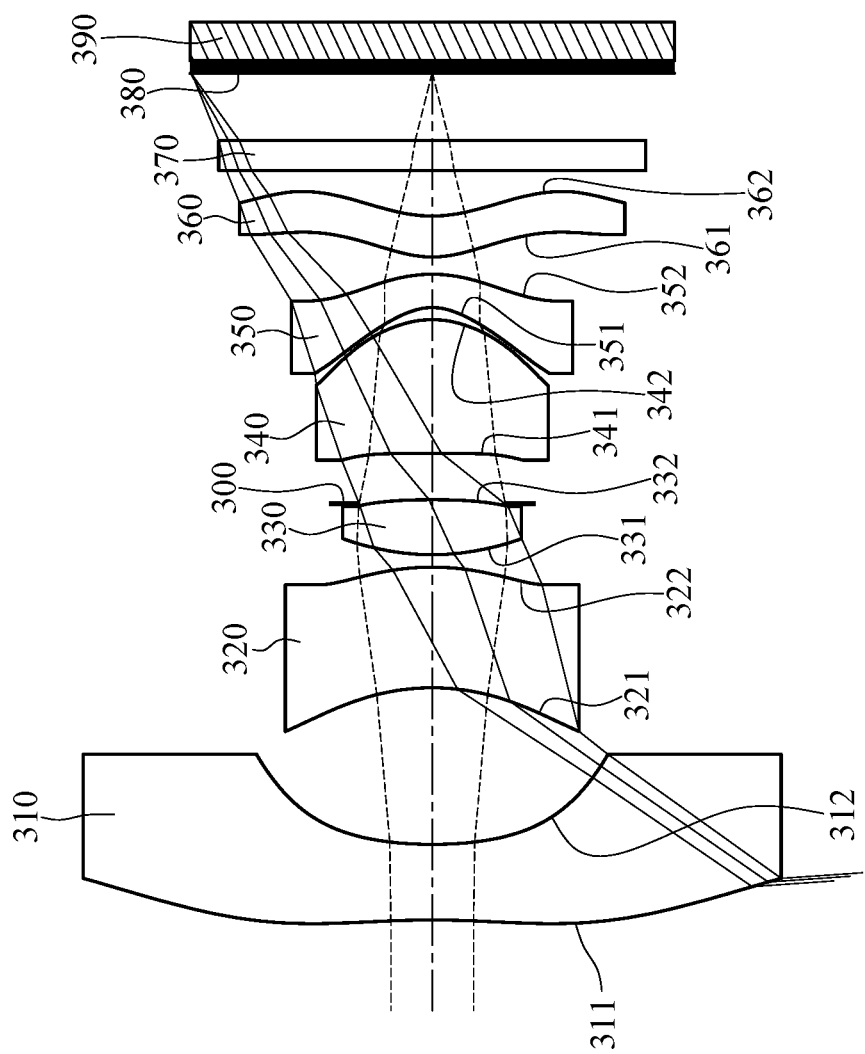
FIG. 5 is a schematic view of an image capturing unit according to the 3rd embodiment of the present disclosure.
Figure 6:
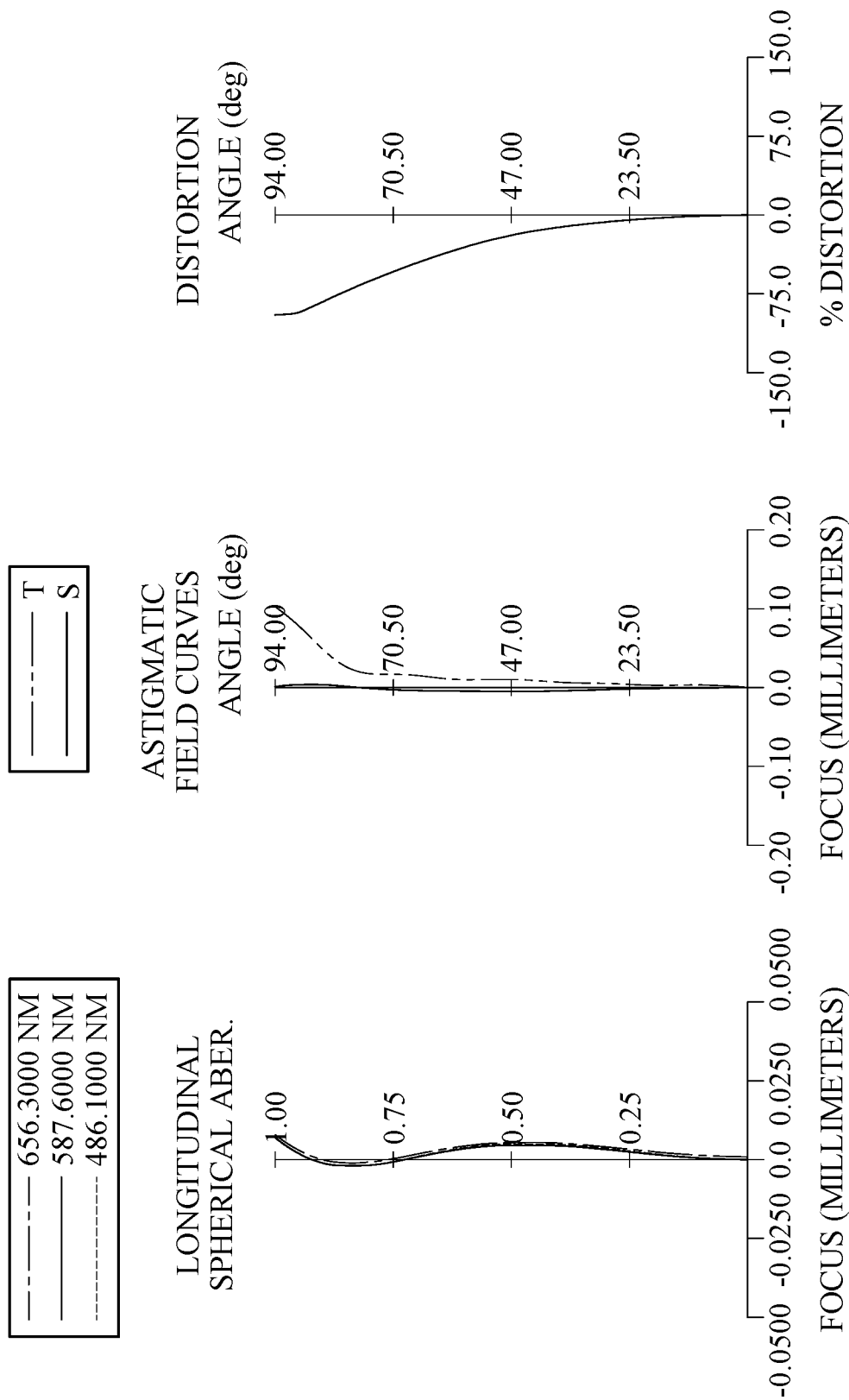
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the optical imaging lens assembly (its reference numeral is omitted) of the present disclosure and an image sensor 390. The optical imaging lens assembly includes, in order from an object side to an image side, a first lens element 310, a second lens element 320, a third lens element 330, an aperture stop 300, a fourth lens element 340, a fifth lens element 350, a sixth lens element 360, an IR-cut filter 370 and an image surface 380. The optical imaging lens assembly includes six lens elements (310, 320, 330, 340, 350 and 360) with no additional lens element disposed between each of the adjacent six lens elements.

The first lens element 310 with negative refractive power has an object-side surface 311 being concave in a paraxial region thereof and an image-side surface 312 being concave in a paraxial region thereof. The first lens element 310 is made of plastic material and has the object-side surface 311 and the image-side surface 312 being both aspheric.

The second lens element 320 with positive refractive power has an object-side surface 321 being concave in a paraxial region thereof and an image-side surface 322 being convex in a paraxial region thereof. The second lens element 320 is made of plastic material and has the object-side surface 321 and the image-side surface 322 being both aspheric.

The third lens element 330 with positive refractive power has an object-side surface 331 being convex in a paraxial region thereof and an image-side surface 332 being convex in a paraxial region thereof. The third lens element 330 is made of plastic material and has the object-side surface 331 and the image-side surface 332 being both aspheric.

The fourth lens element 340 with positive refractive power has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric.

The fifth lens element 350 with negative refractive power has an object-side surface 351 being concave in a paraxial region thereof and an image-side surface 352 being convex in a paraxial region thereof. The fifth lens element 350 is made of plastic material and has the object-side surface 351 and the image-side surface 352 being both aspheric. The image-side surface 352 of the fifth lens element 350 has at least one concave critical point in an off-axis region thereof.

The sixth lens element 360 with positive refractive power has an object-side surface 361 being convex in a paraxial region thereof and an image-side surface 362 being concave in a paraxial region thereof. The sixth lens element 360 is made of plastic material and has the object-side surface 361 and the image-side surface 362 being both aspheric. Each of the object-side surface 361 and the image-side surface 362 of the sixth lens element 360 has at least one critical point in an off-axis region thereof.

The IR-cut filter 370 is made of glass material and located between the sixth lens element 360 and the image surface 380, and will not affect the focal length of the optical imaging lens assembly. The image sensor 390 is disposed on or near the image surface 380 of the optical imaging lens assembly.

In this embodiment, an absolute value of a curvature radius of the object-side surface 351 of the fifth lens element 350 is smaller than the absolute values of the curvature radii of the other lens surfaces of the six lens elements. In detail, the absolute value of the curvature radius of the object-side surface 351 of the fifth lens element 350 is 0.356.

The detailed optical data of the 3rd embodiment are shown in Table 5 and the aspheric surface data are shown in Table 6 below.

TABLE 5

3rd Embodiment
f = 1.12 mm, Fno = 2.05, HFOV = 94.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −5.964 | (ASP) | 0.500 | Plastic | 1.545 | 56.0 | −3.27 |
| 2 | | 2.616 | (ASP) | 1.036 | | | | |
| 3 | Lens 2 | −1.475 | (ASP) | 0.798 | Plastic | 1.560 | 45.0 | 32.86 |
| 4 | | −1.631 | (ASP) | 0.082 | | | | |
| 5 | Lens 3 | 1.580 | (ASP) | 0.364 | Plastic | 1.545 | 56.0 | 2.19 |
| 6 | | −4.498 | (ASP) | −0.026 | | | | |
| 7 | Ape. Stop | Plano | | 0.333 | | | | |
| 8 | Lens 4 | −100.000 | (ASP) | 0.884 | Plastic | 1.545 | 56.0 | 1.12 |
| 9 | | −0.606 | (ASP) | 0.080 | | | | |
| 10 | Lens 5 | −0.356 | (ASP) | 0.220 | Plastic | 1.688 | 18.7 | −0.99 |
| 11 | | −0.935 | (ASP) | 0.114 | | | | |
| 12 | Lens 6 | 0.648 | (ASP) | 0.271 | Plastic | 1.639 | 23.5 | 2.60 |
| 13 | | 0.890 | (ASP) | 0.300 | | | | |
| 14 | IR-cut filter | Plano | | 0.200 | Glass | 1.517 | 64.2 | — |
| 15 | | Plano | | 0.444 | | | | |
| 16 | Image | Plano | | — | | | | |

Note:
Reference wavelength is 587.6 nm (d-line).
An effective radius of the object-side surface 321 (Surface 3) is 0.970 mm.

TABLE 6

Aspheric Coefficients

| Surface # | 1 | 2 | 3 |
|---|---|---|---|
| k = | 9.7556E−01 | 8.6927E−01 | −1.0256E+00 |
| A4 = | 8.6072E−02 | 1.1879E−01 | −4.5856E−03 |
| A6 = | −2.1978E−02 | 3.7734E−02 | −4.6693E−02 |
| A8 = | 2.8381E−03 | 1.7197E−02 | 1.7391E−01 |
| A10 = | −1.5018E−04 | −1.2846E−02 | −8.7496E−02 |

| Surface # | 4 | 5 | 6 |
|---|---|---|---|
| k = | 2.1482E+00 | 3.2530E+00 | 4.9995E+01 |
| A4 = | 1.4980E−01 | −1.6627E−01 | −1.7469E−01 |
| A6 = | 1.7330E−01 | −2.6848E−01 | −8.1279E−01 |
| A8 = | −4.5040E−02 | 2.0968E−01 | 9.1083E−02 |
| A10 = | 5.0967E−01 | — | 2.5621E+00 |

| Surface # | 8 | 9 | 10 |
|---|---|---|---|
| k = | −1.7021E+01 | −1.7670E+00 | −2.9490E+00 |
| A4 = | −3.0800E−01 | 6.0180E−01 | −5.8803E−01 |
| A6 = | 6.0083E−01 | −4.4538E+00 | 2.3192E+00 |
| A8 = | −5.0777E+00 | 9.3229E+00 | −7.0469E+00 |
| A10 = | 8.8068E+00 | −8.9467E+00 | 1.2369E+01 |
| A12 = | — | 3.9855E+00 | −7.9835E+00 |

| Surface # | 11 | 12 | 13 |
|---|---|---|---|
| k = | −3.1460E+00 | −5.9180E+00 | −1.8050E+00 |
| A4 = | −1.8358E−01 | −2.7177E−01 | −6.1247E−01 |
| A6 = | 1.7277E+00 | 7.3054E−02 | 6.0525E−01 |
| A8 = | −2.9542E+00 | 1.4393E−02 | −5.1498E−01 |
| A10 = | 2.4271E+00 | 1.2347E−02 | 2.5819E−01 |
| A12 = | −8.2578E−01 | −7.9150E−03 | −5.0153E−02 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 1.12 | f/R10 | −1.20 |
| Fno | 2.05 | f/R12 | 1.26 |
| HFOV [deg.] | 94.0 | |R11/CT6| + |R12/CT6| | 5.67 |
| FOV [deg.] | 188.0 | CT2/CT3 | 2.19 |
| V5 + V6 | 42.19 | ΣAT/T12 | 1.56 |
| (R5 + R6)/(R5 − R6) | −0.48 | Yc61/Yc62 | 1.00 |
| |f/R3| + |f/R4| | 1.45 | — | — |

4th Embodiment

Figure 7:
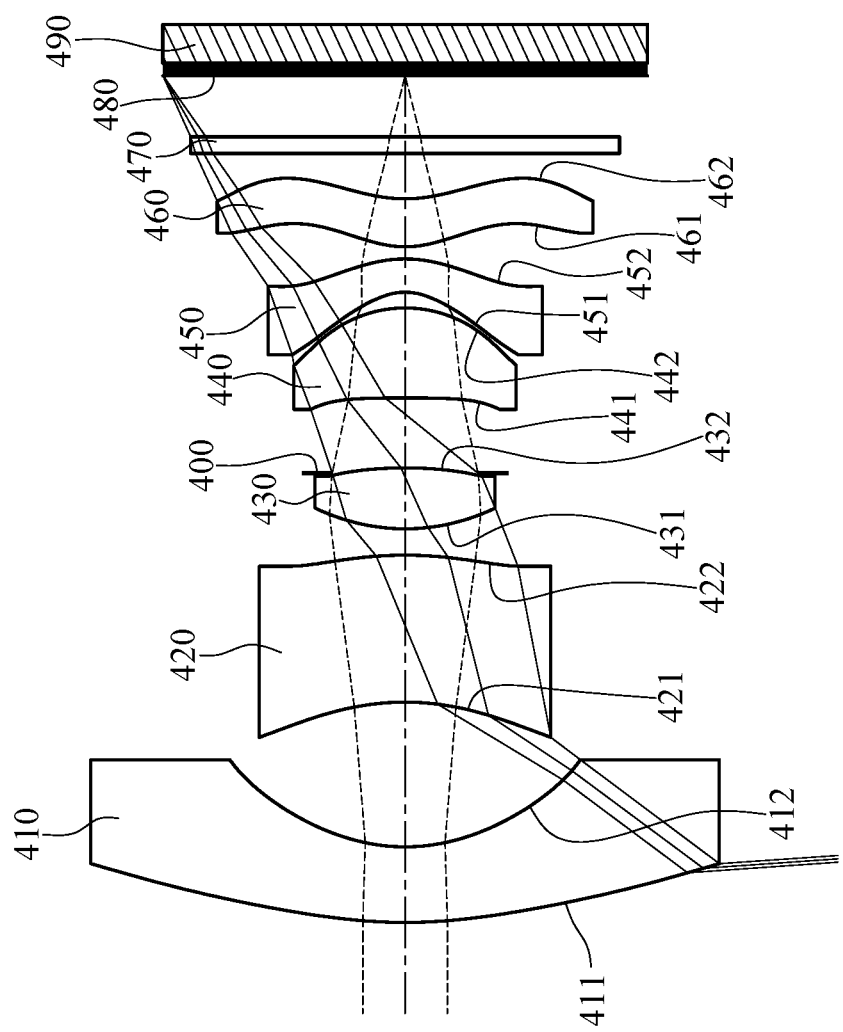
FIG. 7 is a schematic view of an image capturing unit according to the 4th embodiment of the present disclosure.
Figure 8:
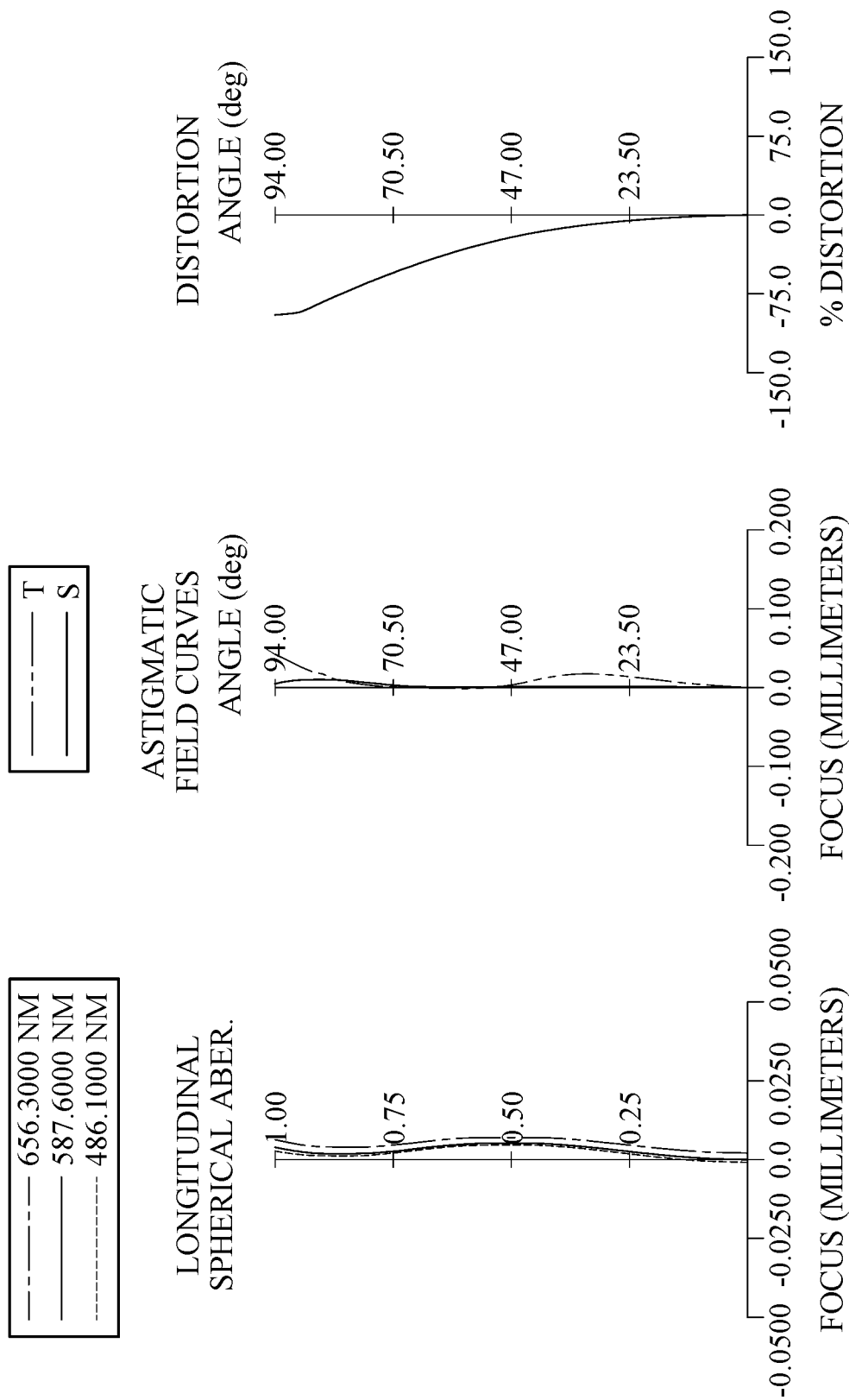
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the optical imaging lens assembly (its reference numeral is omitted) of the present disclosure and an image sensor 490. The optical imaging lens assembly includes, in order from an object side to an image side, a first lens element 410, a second lens element 420, a third lens element 430, an aperture stop 400, a fourth lens element 440, a fifth lens element 450, a sixth lens element 460, an IR-cut filter 470 and an image surface 480. The optical imaging lens assembly includes six lens elements (410, 420, 430, 440, 450 and 460) with no additional lens element disposed between each of the adjacent six lens elements.

The first lens element 410 with negative refractive power has an object-side surface 411 being convex in a paraxial region thereof and an image-side surface 412 being concave in a paraxial region thereof. The first lens element 410 is made of glass material and has the object-side surface 411 and the image-side surface 412 being both aspheric.

The second lens element 420 with negative refractive power has an object-side surface 421 being concave in a paraxial region thereof and an image-side surface 422 being convex in a paraxial region thereof. The second lens element 420 is made of glass material and has the object-side surface 421 and the image-side surface 422 being both aspheric.

The third lens element 430 with positive refractive power has an object-side surface 431 being convex in a paraxial region thereof and an image-side surface 432 being convex in a paraxial region thereof. The third lens element 430 is made of glass material and has the object-side surface 431 and the image-side surface 432 being both aspheric.

The fourth lens element 440 with positive refractive power has an object-side surface 441 being concave in a paraxial region thereof and an image-side surface 442 being convex in a paraxial region thereof. The fourth lens element 440 is made of plastic material and has the object-side surface 441 and the image-side surface 442 being both aspheric.

The fifth lens element 450 with negative refractive power has an object-side surface 451 being concave in a paraxial region thereof and an image-side surface 452 being convex in a paraxial region thereof. The fifth lens element 450 is made of plastic material and has the object-side surface 451 and the image-side surface 452 being both aspheric. The image-side surface 452 of the fifth lens element 450 has at least one concave critical point in an off-axis region thereof.

The sixth lens element 460 with positive refractive power has an object-side surface 461 being convex in a paraxial region thereof and an image-side surface 462 being concave in a paraxial region thereof. The sixth lens element 460 is made of plastic material and has the object-side surface 461 and the image-side surface 462 being both aspheric. Each of the object-side surface 461 and the image-side surface 462 of the sixth lens element 460 has at least one critical point in an off-axis region thereof.

The IR-cut filter 470 is made of glass material and located between the sixth lens element 460 and the image surface 480, and will not affect the focal length of the optical imaging lens assembly. The image sensor 490 is disposed on or near the image surface 480 of the optical imaging lens assembly.

In this embodiment, an absolute value of a curvature radius of the object-side surface 451 of the fifth lens element 450 is smaller than the absolute values of the curvature radii of the other lens surfaces of the six lens elements. In detail, the absolute value of the curvature radius of the object-side surface 451 of the fifth lens element 450 is 0.361.

The detailed optical data of the 4th embodiment are shown in Table 7 and the aspheric surface data are shown in Table 8 below.

TABLE 7

4th Embodiment
f = 1.15 mm, Fno = 2.05, HFOV = 94.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.243 | (ASP) | 0.500 | Glass | 1.610 | 57.9 | −3.55 |
| 2 | | 1.224 | (ASP) | 0.957 | | | | |
| 3 | Lens 2 | −1.746 | (ASP) | 0.973 | Glass | 1.853 | 39.0 | −17.99 |
| 4 | | −2.475 | (ASP) | 0.174 | | | | |
| 5 | Lens 3 | 1.323 | (ASP) | 0.403 | Glass | 1.518 | 63.5 | 1.79 |
| 6 | | −2.746 | (ASP) | −0.035 | | | | |
| 7 | Ape. Stop | Plano | | 0.498 | | | | |
| 8 | Lens 4 | −16.531 | (ASP) | 0.595 | Plastic | 1.544 | 56.0 | 1.55 |
| 9 | | −0.811 | (ASP) | 0.104 | | | | |
| 10 | Lens 5 | −0.361 | (ASP) | 0.220 | Plastic | 1.669 | 19.5 | −1.19 |

TABLE 7-continued

4th Embodiment
f = 1.15 mm, Fno = 2.05, HFOV = 94.0 deg.

| Surface # | | Curvature Radius | | Thickness | Material | Index | Abbe # | Focal Length |
|---|---|---|---|---|---|---|---|---|
| 11 | | −0.824 | (ASP) | 0.080 | | | | |
| 12 | Lens 6 | 0.626 | (ASP) | 0.318 | Plastic | 1.560 | 40.0 | 2.39 |
| 13 | | 0.962 | (ASP) | 0.300 | | | | |
| 14 | IR-cut filter | Plano | | 0.110 | Glass | 1.517 | 64.2 | — |
| 15 | | Plano | | 0.403 | | | | |
| 16 | Image | Plano | | — | | | | |

Note:
Reference wavelength is 587.6 nm (d-line).

TABLE 8

Aspheric Coefficients

| Surface # | 1 | 2 | 3 |
|---|---|---|---|
| k = | −1.7903E+01 | −8.0072E−01 | −2.3869E+00 |
| A4 = | 2.2070E−04 | −6.7759E−02 | −5.2840E−02 |
| A6 = | 1.1122E−03 | 7.7609E−02 | 1.0984E−01 |
| A8 = | −1.3032E−04 | −5.7811E−02 | −4.8038E−02 |
| A10 = | −5.3186E−06 | 2.7983E−02 | 4.5727E−03 |

| Surface # | 4 | 5 | 6 |
|---|---|---|---|
| k = | 3.7890E+00 | 1.6941E+00 | −1.9349E+01 |
| A4 = | 9.6339E−02 | −1.4435E−01 | −2.6698E−01 |
| A6 = | 1.5349E−01 | 1.1122E−02 | 2.1004E−01 |
| A8 = | −1.1533E−01 | −3.1924E−01 | −3.3392E−02 |
| A10 = | 1.8457E−01 | — | — |

| Surface # | 8 | 9 | 10 |
|---|---|---|---|
| k = | 8.1974E+01 | −1.2948E+00 | −2.9193E+00 |
| A4 = | −3.7429E−01 | −1.0711E−01 | −5.0771E−01 |
| A6 = | 8.7898E−01 | −8.7749E−01 | 1.1272E+00 |
| A8 = | −5.2246E+00 | 2.0823E−01 | −3.1957E+00 |
| A10 = | 6.8071E+00 | 2.7177E+00 | 8.6898E+00 |
| A12 = | — | −1.5365E+00 | −7.5925E+00 |

| Surface # | 11 | 12 | 13 |
|---|---|---|---|
| k = | −2.5527E+00 | −5.3659E+00 | −9.8612E−01 |
| A4 = | 4.0303E−01 | −1.7086E−01 | −6.3835E−01 |
| A6 = | −9.0760E−01 | −5.2219E−01 | 2.9678E−01 |
| A8 = | 2.2854E+00 | 7.6208E−01 | −8.9063E−02 |
| A10 = | −2.2005E+00 | −3.7239E−01 | −3.9488E−03 |
| A12 = | 6.6038E−01 | 6.5110E−02 | 1.0841E−02 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 1.15 | f/R10 | −1.39 |
| Fno | 2.05 | f/R12 | 1.19 |
| HFOV [deg.] | 94.0 | |R11/CT6| + |R12/CT6| | 4.99 |
| FOV [deg.] | 188.0 | CT2/CT3 | 2.41 |

-continued

| 4th Embodiment | | | |
|---|---|---|---|
| V5 + V6 | 59.45 | ΣAT/T12 | 1.86 |
| (R5 + R6)/(R5 − R6) | −0.35 | Yc61/Yc62 | 0.95 |
| |f/R3| + |f/R4| | 1.12 | — | — |

5th Embodiment

Figure 9:
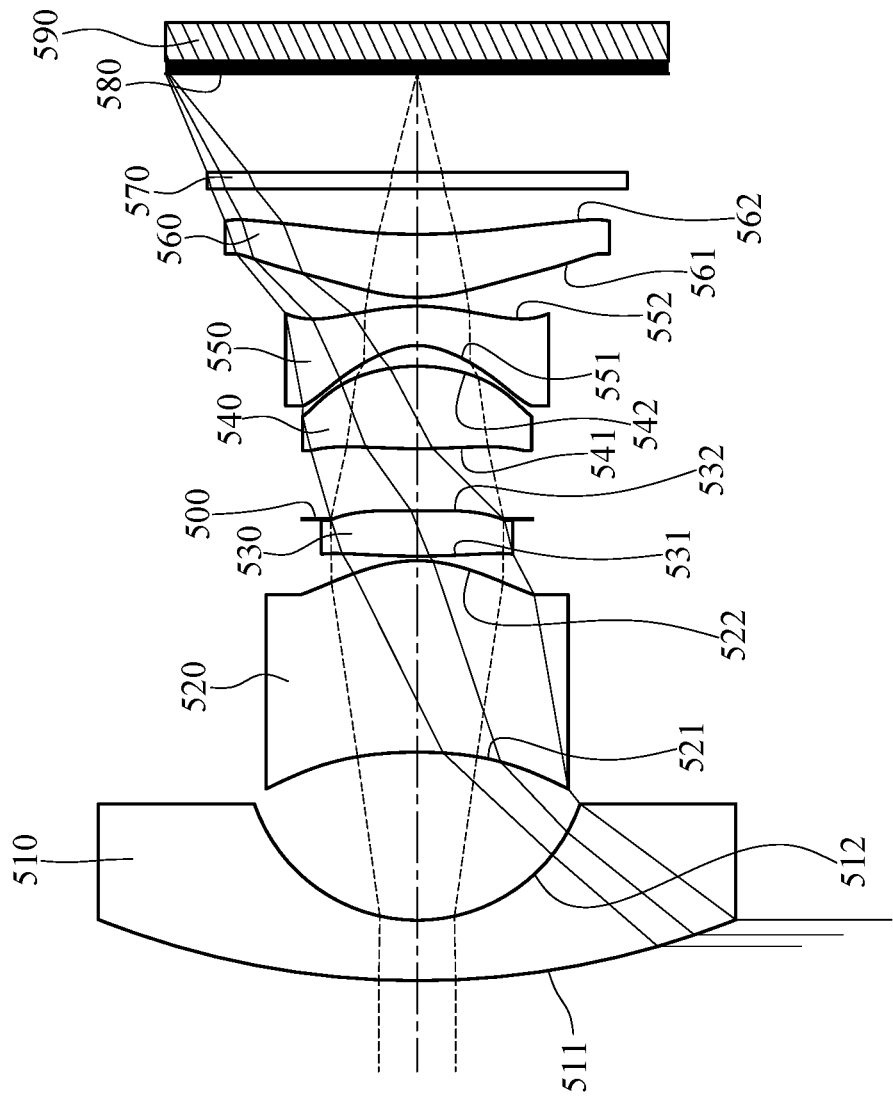
FIG. 9 is a schematic view of an image capturing unit according to the 5th embodiment of the present disclosure.
Figure 10:
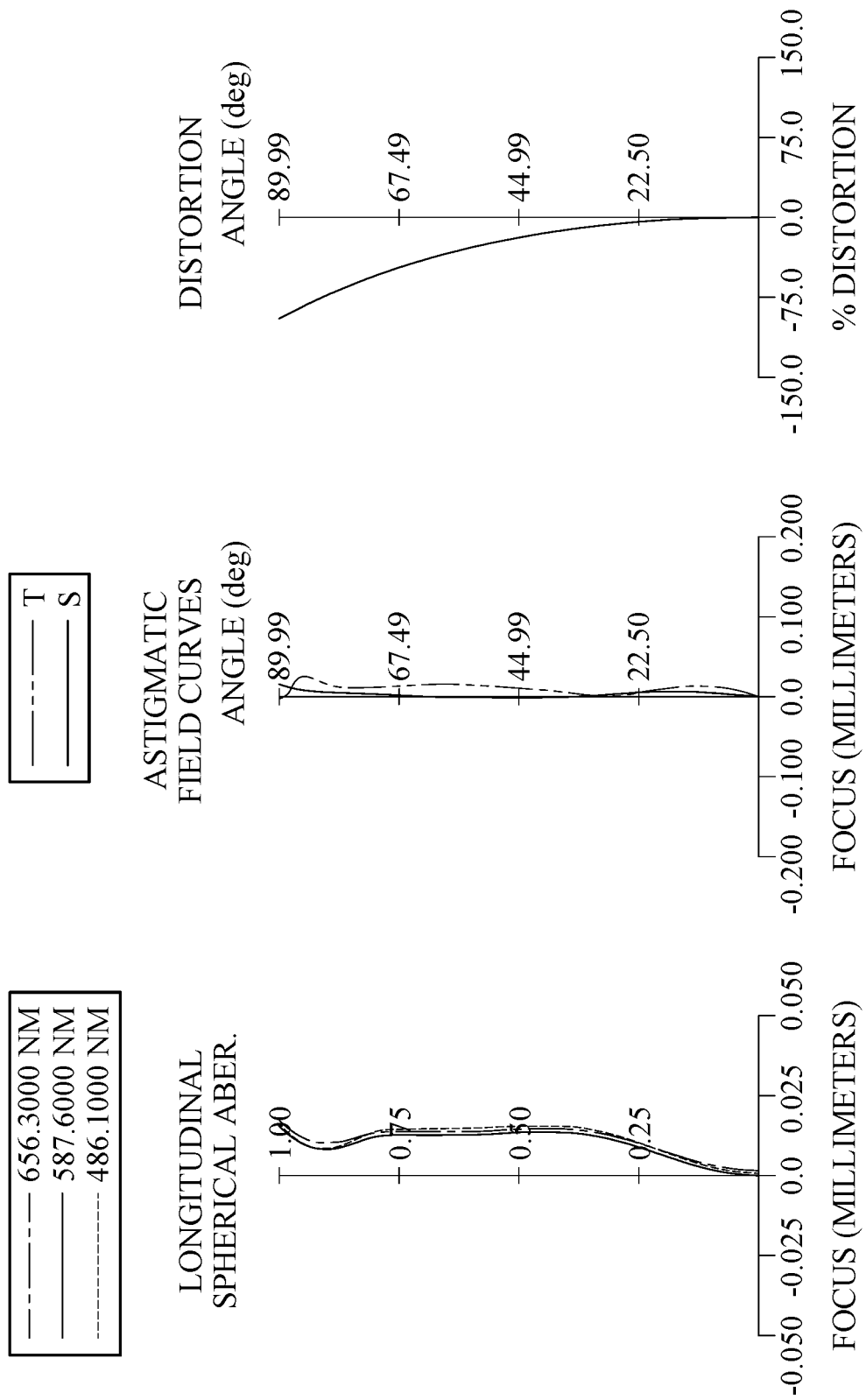
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the optical imaging lens assembly (its reference numeral is omitted) of the present disclosure and an image sensor 590. The optical imaging lens assembly includes, in order from an object side to an image side, a first lens element 510, a second lens element 520, a third lens element 530, an aperture stop 500, a fourth lens element 540, a fifth lens element 550, a sixth lens element 560, an IR-cut filter 570 and an image surface 580. The optical imaging lens assembly includes six lens elements (510, 520, 530, 540, 550 and 560) with no additional lens element disposed between each of the adjacent six lens elements.

The first lens element 510 with negative refractive power has an object-side surface 511 being convex in a paraxial region thereof and an image-side surface 512 being concave in a paraxial region thereof. The first lens element 510 is made of glass material and has the object-side surface 511 and the image-side surface 512 being both spherical.

The second lens element 520 with positive refractive power has an object-side surface 521 being concave in a paraxial region thereof and an image-side surface 522 being convex in a paraxial region thereof. The second lens element 520 is made of plastic material and has the object-side surface 521 and the image-side surface 522 being both aspheric.

The third lens element 530 with positive refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric. The image-side surface 532 of the third lens element 530 has at least one convex critical point in an off-axis region thereof.

The fourth lens element 540 with positive refractive power has an object-side surface 541 being convex in a paraxial region thereof and an image-side surface 542 being convex in a paraxial region thereof. The fourth lens element 540 is made of plastic material and has the object-side surface 541 and the image-side surface 542 being both aspheric.

The fifth lens element 550 with negative refractive power has an object-side surface 551 being concave in a paraxial region thereof and an image-side surface 552 being convex in a paraxial region thereof. The fifth lens element 550 is made of plastic material and has the object-side surface 551 and the image-side surface 552 being both aspheric. The image-side surface 552 of the fifth lens element 550 has at least one concave critical point in an off-axis region thereof.

The sixth lens element 560 with positive refractive power has an object-side surface 561 being convex in a paraxial region thereof and an image-side surface 562 being concave in a paraxial region thereof. The sixth lens element 560 is made of plastic material and has the object-side surface 561 and the image-side surface 562 being both aspheric. The image-side surface 562 of the sixth lens element 560 has at least one critical point in an off-axis region thereof.

The IR-cut filter 570 is made of glass material and located between the sixth lens element 560 and the image surface 580, and will not affect the focal length of the optical imaging lens assembly. The image sensor 590 is disposed on or near the image surface 580 of the optical imaging lens assembly.

In this embodiment, an absolute value of a curvature radius of the object-side surface 551 of the fifth lens element 550 is smaller than the absolute values of the curvature radii of the other lens surfaces of the six lens elements. In detail, the absolute value of the curvature radius of the object-side surface 551 of the fifth lens element 550 is 0.442.

The detailed optical data of the 5th embodiment are shown in Table 9 and the aspheric surface data are shown in Table 10 below.

TABLE 9

5th Embodiment
f = 1.04 mm, Fno = 2.04, HFOV = 90.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 5.686 | | 0.400 | Glass | 1.772 | 49.6 | −1.91 |
| 2 | | 1.138 | | 1.112 | | | | |
| 3 | Lens 2 | −2.883 | (ASP) | 1.267 | Plastic | 1.544 | 56.0 | 1.92 |
| 4 | | −0.886 | (ASP) | 0.030 | | | | |
| 5 | Lens 3 | 5.021 | (ASP) | 0.300 | Plastic | 1.544 | 56.0 | 20.53 |
| 6 | | 8.927 | (ASP) | −0.056 | | | | |
| 7 | Ape. Stop | Plano | | 0.467 | | | | |
| 8 | Lens 4 | 4.124 | (ASP) | 0.545 | Plastic | 1.544 | 56.0 | 1.73 |
| 9 | | −1.161 | (ASP) | 0.137 | | | | |
| 10 | Lens 5 | −0.442 | (ASP) | 0.260 | Plastic | 1.660 | 20.4 | −1.20 |
| 11 | | −1.241 | (ASP) | 0.058 | | | | |
| 12 | Lens 6 | 1.030 | (ASP) | 0.418 | Plastic | 1.544 | 56.0 | 2.34 |
| 13 | | 4.671 | (ASP) | 0.300 | | | | |
| 14 | IR-cut filter | Plano | | 0.110 | Glass | 1.517 | 64.2 | — |
| 15 | | Plano | | 0.652 | | | | |
| 16 | Image | Plano | | — | | | | |

Note:
Reference wavelength is 587.6 nm (d-line).

TABLE 10

Aspheric Coefficients

| Surface # | 3 | 4 | 5 | 6 | 8 |
|---|---|---|---|---|---|
| k = | 2.4651E−01 | −2.5979E+00 | −6.9507E+00 | 1.5217E+01 | −1.6075E+01 |
| A4 = | −1.2155E−01 | 3.0336E−01 | −1.4564E−01 | −1.1974E+00 | −3.3081E−01 |
| A6 = | 2.1980E−02 | −9.5831E−01 | 6.7138E−01 | 2.6741E+00 | −7.7425E−02 |
| A8 = | 3.5614E−02 | 2.1115E+00 | −3.6475E+00 | −5.5773E+00 | 3.7411E+00 |
| A10 = | 2.4540E−02 | −2.5659E+00 | 7.5622E+00 | 6.0555E+00 | −1.3155E+01 |
| A12 = | −2.3345E−02 | 1.4789E+00 | −7.3583E+00 | −2.6877E+00 | 1.2909E+01 |

| Surface # | 9 | 10 | 11 | 12 | 13 |
|---|---|---|---|---|---|
| k = | −1.8109E−01 | −3.0895E+00 | −2.3790E+01 | −2.7794E+00 | −1.6907E−05 |
| A4 = | −1.5186E−01 | −3.7292E−01 | −2.1860E−01 | −5.6866E−01 | 5.0383E−02 |
| A6 = | 7.2148E−01 | 1.5504E+00 | 1.6651E+00 | 1.4422E+00 | −1.6696E−01 |
| A8 = | −5.0959E+00 | −9.1921E+00 | −5.6014E+00 | −2.7778E+00 | 1.6806E−01 |
| A10 = | 8.3864E+00 | 2.0421E+01 | 1.1264E+01 | 3.4520E+00 | −2.1307E−01 |
| A12 = | −3.2362E+00 | −1.3857E+01 | −1.0591E+01 | −2.4824E+00 | 2.5022E−01 |
| A14 = | — | 1.3593E−01 | 3.6652E+00 | 9.4417E−01 | −1.4283E−01 |
| A16 = | — | — | — | −1.4863E−01 | 2.8816E−02 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 1.04 | f/R10 | −0.84 |
| Fno | 2.04 | f/R12 | 0.22 |
| HFOV [deg.] | 90.0 | |R11/CT6| + |R12/CT6| | 13.64 |
| FOV [deg.] | 180.0 | CT2/CT3 | 4.22 |
| V5 + V6 | 76.38 | ΣAT/T12 | 1.57 |
| (R5 + R6)/(R5 − R6) | −3.57 | Yc61/Yc62 | — |
| |f/R3| + |f/R4| | 1.53 | — | — |

6th Embodiment

Figure 11:
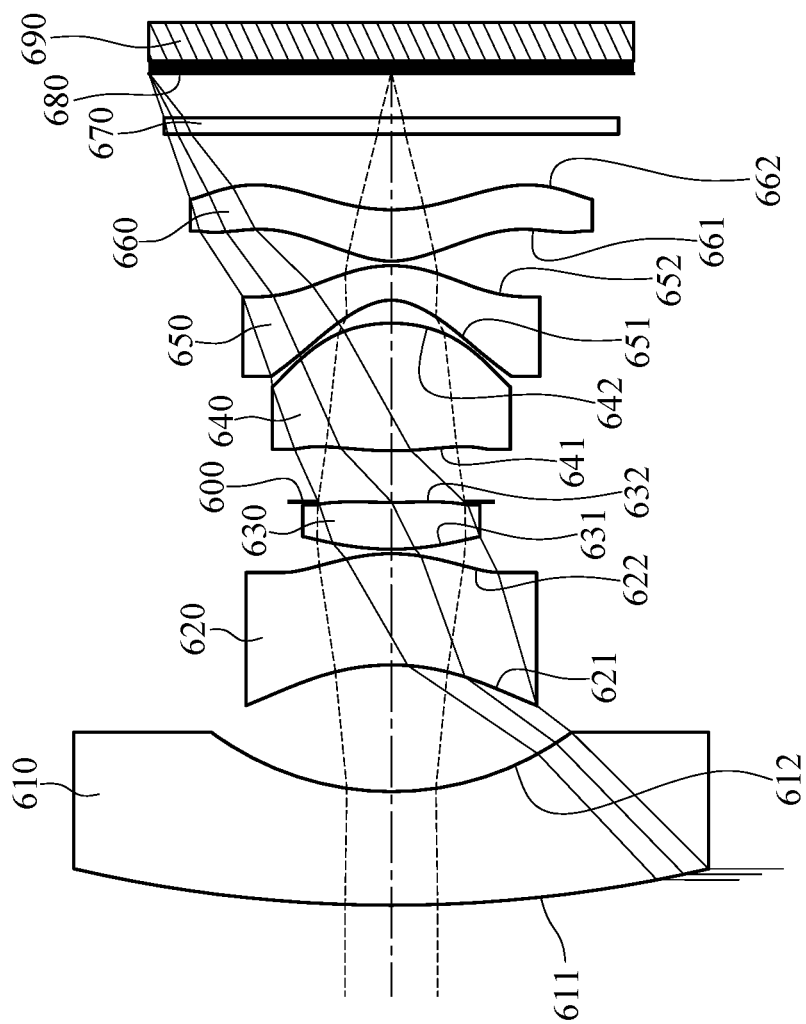
FIG. 11 is a schematic view of an image capturing unit according to the 6th embodiment of the present disclosure.
Figure 12:
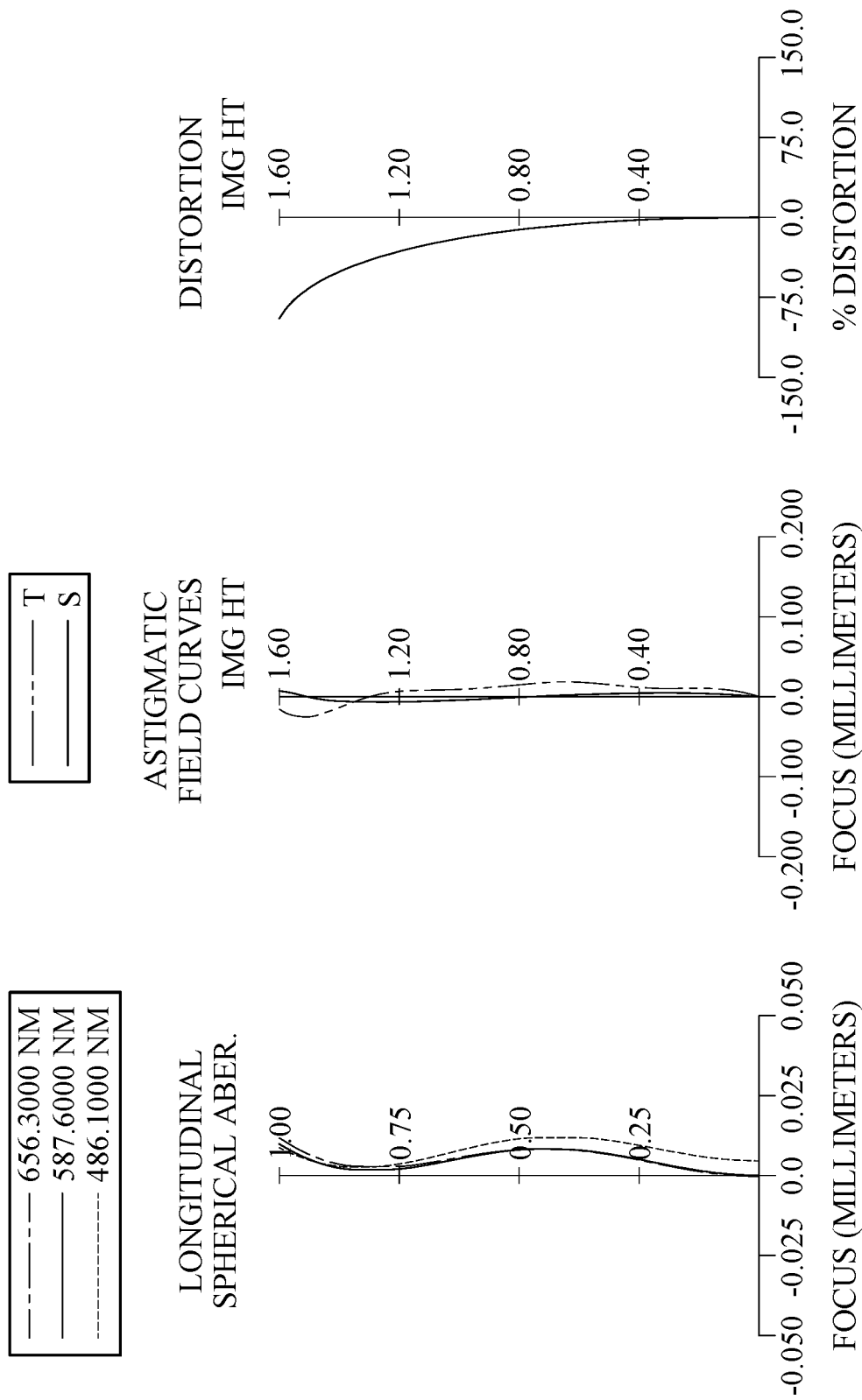
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the optical imaging lens assembly (its reference numeral is omitted) of the present disclosure and an image sensor 690. The optical imaging lens assembly includes, in order from an object side to an image side, a first lens element 610, a second lens element 620, a third lens element 630, an aperture stop 600, a fourth lens element 640, a fifth lens element 650, a sixth lens element 660, an IR-cut filter 670 and an image surface 680. The optical imaging lens assembly includes six lens elements (610, 620, 630, 640, 650 and 660) with no additional lens element disposed between each of the adjacent six lens elements.

The first lens element 610 with negative refractive power has an object-side surface 611 being convex in a paraxial region thereof and an image-side surface 612 being concave in a paraxial region thereof. The first lens element 610 is made of glass material and has the object-side surface 611 and the image-side surface 612 being both spherical.

The second lens element 620 with positive refractive power has an object-side surface 621 being concave in a paraxial region thereof and an image-side surface 622 being convex in a paraxial region thereof. The second lens element 620 is made of plastic material and has the object-side surface 621 and the image-side surface 622 being both aspheric.

The third lens element 630 with positive refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric. The image-side surface 632 of the third lens element 630 has at least one convex critical point in an off-axis region thereof.

The fourth lens element 640 with positive refractive power has an object-side surface 641 being convex in a paraxial region thereof and an image-side surface 642 being convex in a paraxial region thereof. The fourth lens element 640 is made of plastic material and has the object-side surface 641 and the image-side surface 642 being both aspheric.

The fifth lens element 650 with negative refractive power has an object-side surface 651 being concave in a paraxial region thereof and an image-side surface 652 being convex in a paraxial region thereof. The fifth lens element 650 is made of plastic material and has the object-side surface 651 and the image-side surface 652 being both aspheric. The image-side surface 652 of the fifth lens element 650 has at least one concave critical point in an off-axis region thereof.

The sixth lens element 660 with positive refractive power has an object-side surface 661 being convex in a paraxial region thereof and an image-side surface 662 being concave in a paraxial region thereof. The sixth lens element 660 is made of plastic material and has the object-side surface 661 and the image-side surface 662 being both aspheric. Each of the object-side surface 661 and the image-side surface 662 of the sixth lens element 660 has at least one critical point in an off-axis region thereof.

The IR-cut filter 670 is made of glass material and located between the sixth lens element 660 and the image surface 680, and will not affect the focal length of the optical imaging lens assembly. The image sensor 690 is disposed on or near the image surface 680 of the optical imaging lens assembly.

In this embodiment, an absolute value of a curvature radius of the object-side surface 651 of the fifth lens element 650 is smaller than the absolute values of the curvature radii of the other lens surfaces of the six lens elements. In detail, the absolute value of the curvature radius of the object-side surface 651 of the fifth lens element 650 is 0.312.

The detailed optical data of the 6th embodiment are shown in Table 11 and the aspheric surface data are shown in Table 12 below.

TABLE 11

6th Embodiment
f = 1.24 mm, Fno = 2.05, HFOV = 89.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 9.262 | | 0.750 | Glass | 1.835 | 42.7 | −3.20 |
| 2 | | 1.999 | | 0.839 | | | | |
| 3 | Lens 2 | −1.523 | (ASP) | 0.736 | Plastic | 1.544 | 56.0 | 5.30 |
| 4 | | −1.166 | (ASP) | 0.030 | | | | |
| 5 | Lens 3 | 1.826 | (ASP) | 0.310 | Plastic | 1.544 | 56.0 | 5.22 |
| 6 | | 4.813 | (ASP) | 0.002 | | | | |
| 7 | Ape. Stop | Plano | | 0.339 | | | | |
| 8 | Lens 4 | 2.289 | (ASP) | 0.844 | Plastic | 1.544 | 56.0 | 1.35 |

TABLE 11-continued

6th Embodiment
f = 1.24 mm, Fno = 2.05, HFOV = 89.9 deg.

| Surface # | | Curvature Radius | | Thickness | Material | Index | Abbe # | Focal Length |
|---|---|---|---|---|---|---|---|---|
| 9 | | −0.936 | (ASP) | 0.152 | | | | |
| 10 | Lens 5 | −0.312 | (ASP) | 0.228 | Plastic | 1.660 | 20.4 | −0.92 |
| 11 | | −0.828 | (ASP) | 0.030 | | | | |
| 12 | Lens 6 | 0.529 | (ASP) | 0.340 | Plastic | 1.544 | 56.0 | 1.50 |
| 13 | | 1.172 | (ASP) | 0.500 | | | | |
| 14 | IR-cut filter | Plano | | 0.110 | Glass | 1.517 | 64.2 | — |
| 15 | | Plano | | 0.291 | | | | |
| 16 | Image | Plano | | — | | | | |

Note:
Reference wavelength is 587.6 nm (d-line).

TABLE 12

Aspheric Coefficients

| Surface # | 3 | 4 | 5 | 6 | 8 |
|---|---|---|---|---|---|
| k = | −1.9335E+00 | −3.2088E−01 | −2.9557E−01 | 5.8433E+01 | −1.1793E+01 |
| A4 = | −1.0763E−01 | 4.3118E−01 | −6.4719E−02 | −9.6105E−01 | −3.2419E−01 |
| A6 = | 2.1921E−01 | −1.9142E−01 | 1.0698E−01 | 1.0642E+00 | 4.8745E−01 |
| A8 = | −1.0601E−01 | 1.5723E−01 | −6.8161E−01 | −1.7274E+00 | −3.8016E+00 |
| A10 = | 1.0217E−02 | 3.8311E−01 | — | — | 5.2937E+00 |

| Surface # | 9 | 10 | 11 | 12 | 13 |
|---|---|---|---|---|---|
| k = | −8.0797E−01 | −3.2414E+00 | −4.5791E+00 | −6.4410E+00 | −7.5770E−01 |
| A4 = | 4.5509E−03 | −1.6387E+00 | −4.4550E−01 | 5.6089E−02 | −2.7169E−01 |
| A6 = | −3.5305E+00 | 5.0800E+00 | 2.1965E+00 | −5.0549E−01 | −1.2904E−01 |
| A8 = | 1.2224E+01 | −7.4846E+00 | −3.2512E+00 | 4.1099E−01 | 1.7761E−01 |
| A10 = | −1.7407E+01 | 6.2495E+00 | 2.3060E+00 | −1.0649E−01 | −8.2823E−02 |
| A12 = | 9.6546E+00 | −2.4899E+00 | −6.6621E−01 | 5.6796E−03 | 1.6374E−02 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 1.24 | f/R10 | −1.50 |
| Fno | 2.05 | f/R12 | 1.06 |
| HFOV [deg.] | 89.9 | |R11/CT6| + |R12/CT6| | 5.00 |
| FOV [deg.] | 179.8 | CT2/CT3 | 2.37 |
| V5 + V6 | 76.38 | ΣAT/T12 | 1.66 |
| (R5 + R6)/(R5 − R6) | −2.22 | Yc61/Yc62 | 0.97 |
| |f/R3| + |f/R4| | 1.88 | — | |

7th Embodiment

Figure 13:
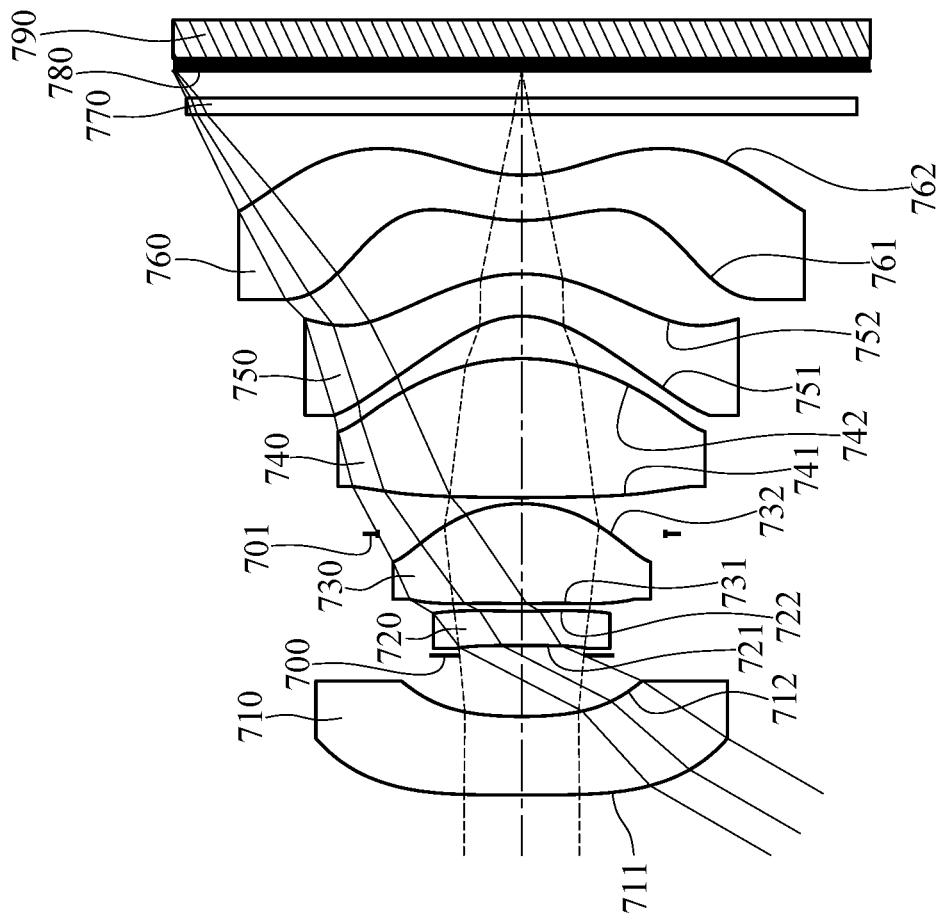
FIG. 13 is a schematic view of an image capturing unit according to the 7th embodiment of the present disclosure.
Figure 14:
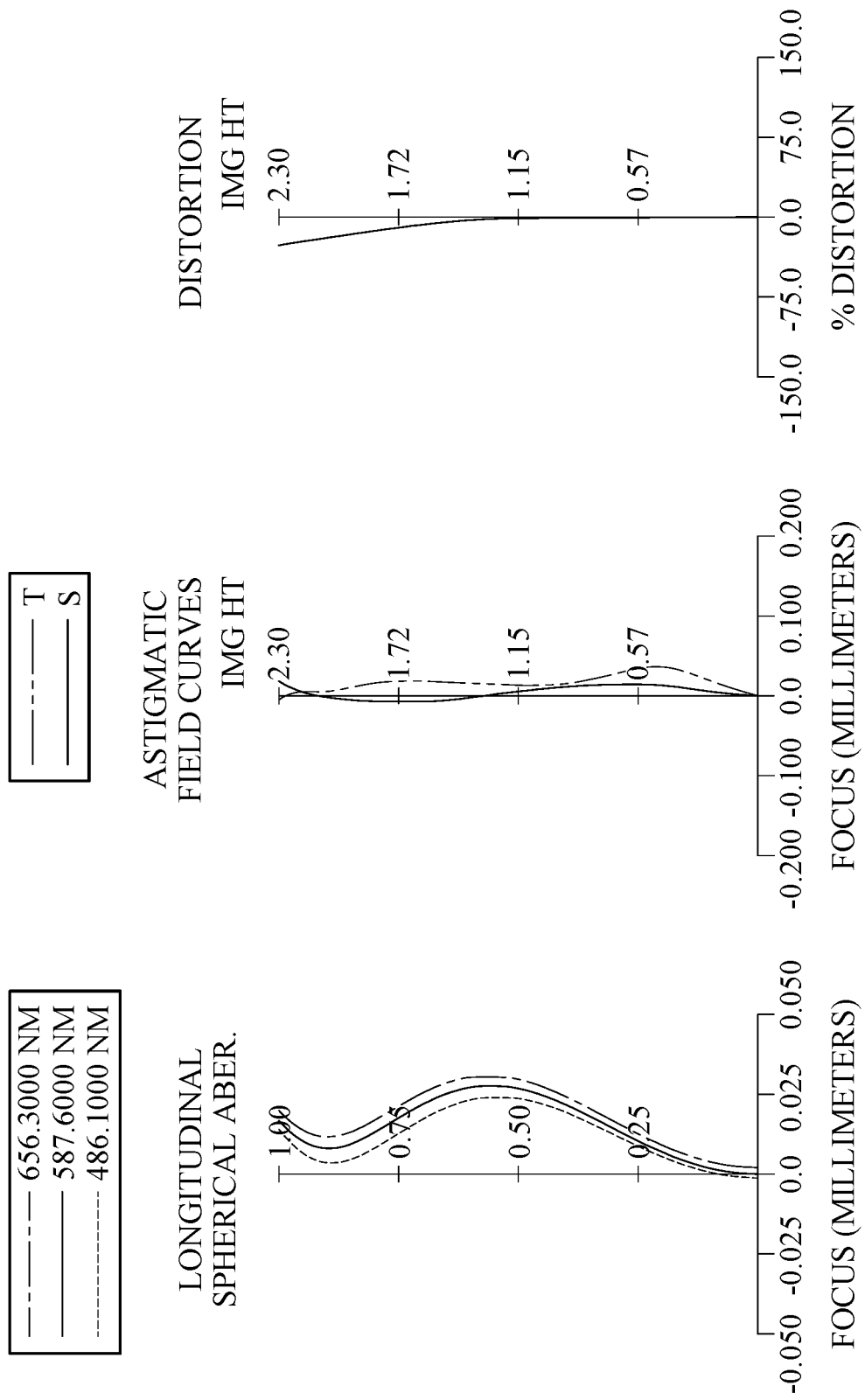
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the optical imaging lens assembly (its reference numeral is omitted) of the present disclosure and an image sensor 790. The optical imaging lens assembly includes, in order from an object side to an image side, a first lens element 710, an aperture stop 700, a second lens element 720, a third lens element 730, a stop 701, a fourth lens element 740, a fifth lens element 750, a sixth lens element 760, an IR-cut filter 770 and an image surface 780. The optical imaging lens assembly includes six lens elements (710, 720, 730, 740, 750 and 760) with no additional lens element disposed between each of the adjacent six lens elements.

The first lens element 710 with negative refractive power has an object-side surface 711 being concave in a paraxial region thereof and an image-side surface 712 being concave in a paraxial region thereof. The first lens element 710 is made of plastic material and has the object-side surface 711 and the image-side surface 712 being both aspheric.

The second lens element 720 with negative refractive power has an object-side surface 721 being concave in a paraxial region thereof and an image-side surface 722 being concave in a paraxial region thereof. The second lens element 720 is made of plastic material and has the object-side surface 721 and the image-side surface 722 being both aspheric.

The third lens element 730 with positive refractive power has an object-side surface 731 being convex in a paraxial region thereof and an image-side surface 732 being convex in a paraxial region thereof. The third lens element 730 is made of plastic material and has the object-side surface 731 and the image-side surface 732 being both aspheric.

The fourth lens element 740 with positive refractive power has an object-side surface 741 being convex in a paraxial region thereof and an image-side surface 742 being convex in a paraxial region thereof. The fourth lens element 740 is made of plastic material and has the object-side surface 741 and the image-side surface 742 being both aspheric.

The fifth lens element 750 with negative refractive power has an object-side surface 751 being concave in a paraxial region thereof and an image-side surface 752 being convex in a paraxial region thereof. The fifth lens element 750 is made of plastic material and has the object-side surface 751 and the image-side surface 752 being both aspheric. The image-side surface 752 of the fifth lens element 750 has at least one concave critical point in an off-axis region thereof.

The sixth lens element 760 with negative refractive power has an object-side surface 761 being convex in a paraxial region thereof and an image-side surface 762 being concave in a paraxial region thereof. The sixth lens element 760 is made of plastic material and has the object-side surface 761 and the image-side surface 762 being both aspheric. Each of the object-side surface 761 and the image-side surface 762 of the sixth lens element 760 has at least one critical point in an off-axis region thereof.

The IR-cut filter 770 is made of glass material and located between the sixth lens element 760 and the image surface 780, and will not affect the focal length of the optical imaging lens assembly. The image sensor 790 is disposed on or near the image surface 780 of the optical imaging lens assembly.

In this embodiment, an absolute value of a curvature radius of the object-side surface 751 of the fifth lens element 750 is smaller than the absolute values of the curvature radii of the other surfaces of the six lens elements. In detail, the absolute value of the curvature radius of the object-side surface 751 of the fifth lens element 750 is 0.577.

The detailed optical data of the 7th embodiment are shown in Table 13 and the aspheric surface data are shown in Table 14 below.

TABLE 14

Aspheric Coefficients

| 表面 | 1 | 2 | 4 |
|---|---|---|---|
| k = | 3.3804E+01 | −2.6042E+00 | −9.0000E+01 |
| A4 = | 1.5727E−01 | 2.9443E−01 | −4.3376E−01 |
| A6 = | −5.8766E−02 | 6.5113E−01 | 1.2395E−01 |
| A8 = | 1.4725E−02 | −3.9461E+00 | −1.0130E+00 |
| A10 = | 7.4826E−03 | 1.1330E+01 | −6.6061E+00 |
| A12 = | −3.7295E−03 | −1.4910E+01 | — |
| A14 = | 4.1923E−04 | 7.0401E+00 | — |
| A16 = | — | — | — |

| 表面 | 5 | 6 | 7 |
|---|---|---|---|
| k = | −7.4851E+01 | −8.6745E+01 | −2.8287E−01 |
| A4 = | −4.9087E−01 | −3.6805E−01 | −6.7690E−02 |
| A6 = | 8.8813E−01 | 3.7001E−01 | −2.9225E−01 |
| A8 = | −1.3067E−01 | 4.9943E+00 | 2.5052E+00 |
| A10 = | −3.4030E+00 | −1.6200E+01 | −5.9415E+00 |
| A12 = | 1.7370E+00 | 2.0008E+01 | 6.9575E+00 |
| A14 = | — | −9.0106E+00 | −2.5205E+00 |
| A16 = | — | — | −2.5737E−01 |

| Surface # | 9 | 10 | 11 |
|---|---|---|---|
| k = | 4.1209E+01 | −1.8045E+00 | −1.6207E+00 |
| A4 = | −1.2626E−01 | 1.2495E−02 | 3.5404E−01 |
| A6 = | 3.2790E−01 | −3.7485E−01 | −8.8339E−01 |
| A8 = | −1.9351E−01 | 1.0310E+00 | 1.8658E+00 |
| A10 = | −1.9137E−01 | −1.4140E+00 | −2.3480E+00 |
| A12 = | 3.6604E−01 | 1.0100E+00 | 1.6197E+00 |
| A14 = | −2.2802E−01 | −3.4985E−01 | −5.6302E−01 |
| A16 = | 5.2665E−02 | 4.6921E−02 | 7.6913E−02 |

| Surface # | 12 | 13 | 14 |
|---|---|---|---|
| k = | −8.5522E−01 | −1.3882E+00 | −9.3618E−01 |
| A4 = | 1.8032E−01 | −7.3419E−01 | −6.1683E−01 |
| A6 = | 4.5143E−02 | 3.5824E−01 | 3.5245E−01 |
| A8 = | −1.7118E−01 | −4.6880E−01 | −1.4464E−01 |
| A10 = | 2.3402E−01 | 4.9699E−01 | 3.6243E−02 |

TABLE 13

7th Embodiment
f = 1.83 mm, Fno = 2.40, HFOV = 60.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −100.000 | (ASP) | 0.518 | Plastic | 1.544 | 55.9 | −5.20 |
| 2 | | 2.912 | (ASP) | 0.403 | | | | |
| 3 | Ape. Stop | Plano | | 0.067 | | | | |
| 4 | Lens 2 | −43.201 | (ASP) | 0.227 | Plastic | 1.660 | 20.4 | −9.40 |
| 5 | | 7.257 | (ASP) | 0.051 | | | | |
| 6 | Lens 3 | 13.620 | (ASP) | 0.660 | Plastic | 1.544 | 55.9 | 1.65 |
| 7 | | −0.945 | (ASP) | −0.200 | | | | |
| 8 | Stop | Plano | | 0.240 | | | | |
| 9 | Lens 4 | 11.165 | (ASP) | 0.919 | Plastic | 1.544 | 55.9 | 2.40 |
| 10 | | −1.438 | (ASP) | 0.281 | | | | |
| 11 | Lens 5 | −0.577 | (ASP) | 0.280 | Plastic | 1.660 | 20.4 | −2.59 |
| 12 | | −1.038 | (ASP) | 0.352 | | | | |
| 13 | Lens 6 | 1.124 | (ASP) | 0.300 | Plastic | 1.639 | 23.5 | −19.49 |
| 14 | | 0.924 | (ASP) | 0.400 | | | | |
| 15 | IR-cut filter | Plano | | 0.110 | Glass | 1.517 | 64.2 | — |
| 16 | | Plano | | 0.180 | | | | |
| 17 | Image | Plano | | — | | | | |

Note:
Reference wavelength is 587.6 nm (d-line).
An effective radius of the stop 701 (Surface 8) is 0.950 mm.

TABLE 14-continued

| Aspheric Coefficients | | | |
|---|---|---|---|
| A12 = | −1.4009E−01 | −2.3618E−01 | −4.8798E−03 |
| A14 = | 3.8004E−02 | 5.1713E−02 | 3.0608E−04 |
| A16 = | −3.8891E−03 | −4.3327E−03 | −7.2507E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 1.83 | f/R10 | −1.76 |
| Fno | 2.40 | f/R12 | 1.98 |
| HFOV [deg.] | 60.0 | \|R11/CT6\| + \|R12/CT6\| | 6.83 |
| FOV [deg.] | 120.0 | CT2/CT3 | 0.34 |
| V5 + V6 | 43.89 | ΣAT/T12 | 2.54 |
| (R5 + R6)/(R5 − R6) | 0.87 | Yc61/Yc62 | 0.63 |
| \|f/R3\| + \|f/R4\| | 0.29 | — | — |

8th Embodiment

Figure 15:
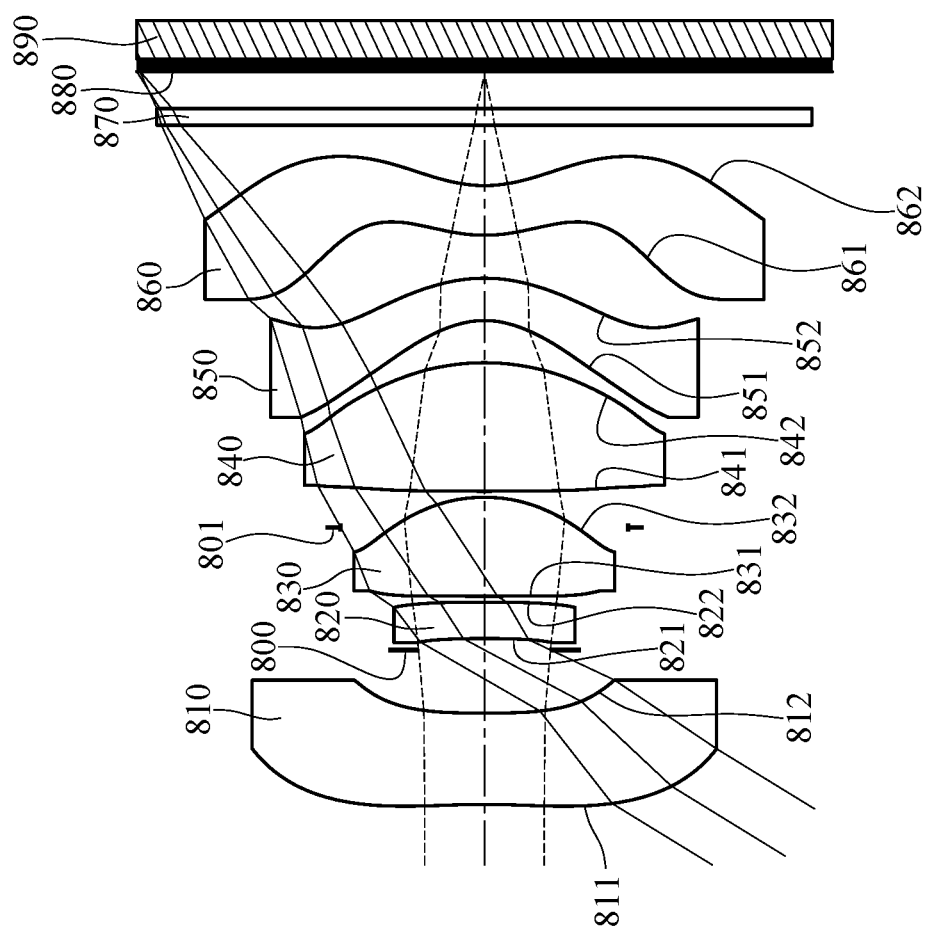
FIG. 15 is a schematic view of an image capturing unit according to the 8th embodiment of the present disclosure.
Figure 16:
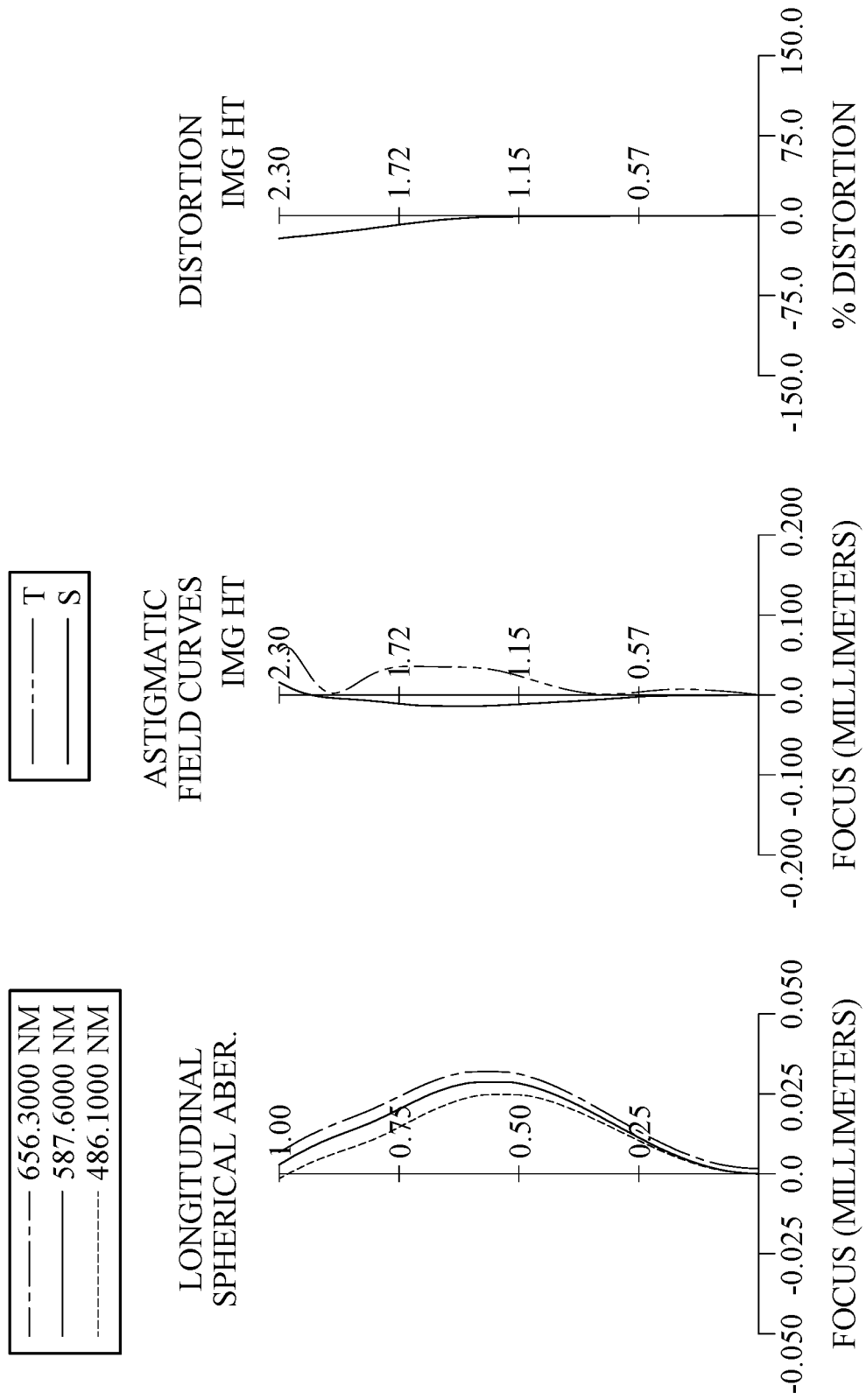
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the optical imaging lens assembly (its reference numeral is omitted) of the present disclosure and an image sensor 890. The optical imaging lens assembly includes, in order from an object side to an image side, a first lens element 810, an aperture stop 800, a second lens element 820, a third lens element 830, a stop 801, a fourth lens element 840, a fifth lens element 850, a sixth lens element 860, an IR-cut filter 870 and an image surface 880. The optical imaging lens assembly includes six lens elements (810, 820, 830, 840, 850 and 860) with no additional lens element disposed between each of the adjacent six lens elements.

The first lens element 810 with negative refractive power has an object-side surface 811 being concave in a paraxial region thereof and an image-side surface 812 being concave in a paraxial region thereof. The first lens element 810 is made of plastic material and has the object-side surface 811 and the image-side surface 812 being both aspheric.

The second lens element 820 with negative refractive power has an object-side surface 821 being concave in a paraxial region thereof and an image-side surface 822 being concave in a paraxial region thereof. The second lens element 820 is made of plastic material and has the object-side surface 821 and the image-side surface 822 being both aspheric.

The third lens element 830 with positive refractive power has an object-side surface 831 being convex in a paraxial region thereof and an image-side surface 832 being convex in a paraxial region thereof. The third lens element 830 is made of plastic material and has the object-side surface 831 and the image-side surface 832 being both aspheric.

The fourth lens element 840 with positive refractive power has an object-side surface 841 being convex in a paraxial region thereof and an image-side surface 842 being convex in a paraxial region thereof. The fourth lens element 840 is made of plastic material and has the object-side surface 841 and the image-side surface 842 being both aspheric.

The fifth lens element 850 with negative refractive power has an object-side surface 851 being concave in a paraxial region thereof and an image-side surface 852 being convex in a paraxial region thereof. The fifth lens element 850 is made of plastic material and has the object-side surface 851 and the image-side surface 852 being both aspheric. The image-side surface 852 of the fifth lens element 850 has at least one concave critical point in an off-axis region thereof.

The sixth lens element 860 with negative refractive power has an object-side surface 861 being convex in a paraxial region thereof and an image-side surface 862 being concave in a paraxial region thereof. The sixth lens element 860 is made of plastic material and has the object-side surface 861 and the image-side surface 862 being both aspheric. Each of the object-side surface 861 and the image-side surface 862 of the sixth lens element 860 has at least one critical point in an off-axis region thereof.

The IR-cut filter 870 is made of glass material and located between the sixth lens element 860 and the image surface 880, and will not affect the focal length of the optical imaging lens assembly. The image sensor 890 is disposed on or near the image surface 880 of the optical imaging lens assembly.

In this embodiment, an absolute value of a curvature radius of the object-side surface 851 of the fifth lens element 850 is smaller than the absolute values of the curvature radii of the other surfaces of the six lens elements. In detail, the absolute value of the curvature radius of the object-side surface 851 of the fifth lens element 850 is 0.583.

The detailed optical data of the 8th embodiment are shown in Table 15 and the aspheric surface data are shown in Table 16 below.

TABLE 15

8th Embodiment
f = 1.82 mm, Fno = 2.30, HFOV = 58.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −5.636 | (ASP) | 0.604 | Plastic | 1.534 | 55.9 | −6.48 |
| 2 | | 9.309 | (ASP) | 0.418 | | | | |
| 3 | Ape. Stop | Plano | | 0.076 | | | | |
| 4 | Lens 2 | −7.676 | (ASP) | 0.239 | Plastic | 1.669 | 19.5 | −10.65 |

TABLE 15-continued

8th Embodiment
f = 1.82 mm, Fno = 2.30, HFOV = 58.4 deg.

| Surface # | | Curvature Radius | | Thickness | Material | Index | Abbe # | Focal Length |
|---|---|---|---|---|---|---|---|---|
| 5 | | 100.000 | (ASP) | 0.040 | | | | |
| 6 | Lens 3 | 8.209 | (ASP) | 0.655 | Plastic | 1.544 | 56.0 | 1.70 |
| 7 | | −1.016 | (ASP) | −0.200 | | | | |
| 8 | Stop | Plano | | 0.240 | | | | |
| 9 | Lens 4 | 18.371 | (ASP) | 0.850 | Plastic | 1.544 | 56.0 | 2.64 |
| 10 | | −1.530 | (ASP) | 0.279 | | | | |
| 11 | Lens 5 | −0.583 | (ASP) | 0.280 | Plastic | 1.669 | 19.5 | −2.56 |
| 12 | | −1.054 | (ASP) | 0.284 | | | | |
| 13 | Lens 6 | 1.010 | (ASP) | 0.328 | Plastic | 1.633 | 23.4 | −81.01 |
| 14 | | 0.866 | (ASP) | 0.400 | | | | |
| 15 | IR-cut filter | Plano | | 0.110 | Glass | 1.517 | 64.2 | — |
| 16 | | Plano | | 0.245 | | | | |
| 17 | Image | Plano | | — | | | | |

Note:
Reference wavelength is 587.6 nm (d-line).
An effective radius of the stop 801 (Surface 8) is 0.950 mm.

TABLE 16

Aspheric Coefficients

| Surface # | 1 | 2 | 4 |
|---|---|---|---|
| k = | 1.0329E+01 | 8.2507E+01 | −9.0000E+01 |
| A4 = | 2.1125E−01 | 4.0020E−01 | −3.8170E−01 |
| A6 = | −1.4002E−01 | −2.3043E−01 | 6.8889E−01 |
| A8 = | 9.2856E−02 | −4.3009E−01 | −3.5835E+00 |
| A10 = | −3.8039E−02 | 2.0085E+00 | 3.0627E−01 |
| A12 = | 9.2287E−03 | −2.0747E+00 | — |
| A14 = | −8.7444E−04 | 5.4810E−01 | — |
| A16 = | — | — | — |

| Surface # | 5 | 6 | 7 |
|---|---|---|---|
| k = | −7.4851E+01 | 7.9114E+01 | −2.2128E−01 |
| A4 = | −5.2385E−01 | −5.1980E−01 | −1.8295E−01 |
| A6 = | 1.2635E+00 | 1.3917E+00 | 1.0040E+00 |
| A8 = | −8.0097E−01 | 3.2024E−02 | −3.5576E+00 |
| A10 = | −3.1877E+00 | −4.6165E+00 | 1.0423E+01 |
| A12 = | 2.4738E+00 | 7.1420E+00 | −2.0052E+01 |
| A14 = | — | −3.5310E+00 | 2.1485E+01 |
| A16 = | — | — | −8.8427E+00 |

| 表面 | 9 | 10 | 11 |
|---|---|---|---|
| k = | 4.1209E+01 | −1.6987E+00 | −1.6016E+00 |
| A4 = | −1.4434E−01 | 2.4992E−02 | 4.8998E−01 |
| A6 = | 6.4054E−01 | −7.1556E−01 | −2.0893E+00 |
| A8 = | −1.1753E+00 | 2.3104E+00 | 5.4002E+00 |
| A10 = | 1.3609E+00 | −3.2956E+00 | −7.3656E+00 |
| A12 = | −1.1353E+00 | 2.2970E+00 | 5.3942E+00 |
| A14 = | 5.7592E−01 | −7.5528E−01 | −2.0061E+00 |
| A16 = | −1.2066E−01 | 9.3461E−02 | 2.9712E−01 |

| 表面 | 12 | 13 | 14 |
|---|---|---|---|
| k = | −8.6845E−01 | −1.3485E+00 | −9.6099E−01 |
| A4 = | 2.2047E−01 | −7.3218E−01 | −6.4244E−01 |
| A6 = | −2.9112E−01 | 3.2534E−01 | 3.4864E−01 |
| A8 = | 4.5829E−01 | −4.5217E−01 | −1.0962E−01 |
| A10 = | −2.8090E−01 | 5.3263E−01 | 4.9460E−03 |
| A12 = | 7.5812E−02 | −2.7279E−01 | 7.3268E−03 |
| A14 = | −8.0668E−03 | 6.3879E−02 | −1.9383E−03 |
| A16 = | 1.1505E−04 | −5.7154E−03 | 1.5148E−04 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 1.82 | f/R10 | −1.72 |
| Fno | 2.30 | f/R12 | 2.10 |
| HFOV [deg.] | 58.4 | |R11/CT6| + |R12/CT6| | 5.72 |
| FOV [deg.] | 116.8 | CT2/CT3 | 0.36 |
| V5 + V6 | 42.81 | ΣAT/T12 | 2.30 |
| (R5 + R6)/(R5 − R6) | 0.78 | Yc61/Yc62 | 0.65 |
| |f/R3| + |f/R4| | 0.25 | — | — |

9th Embodiment

Figure 17:
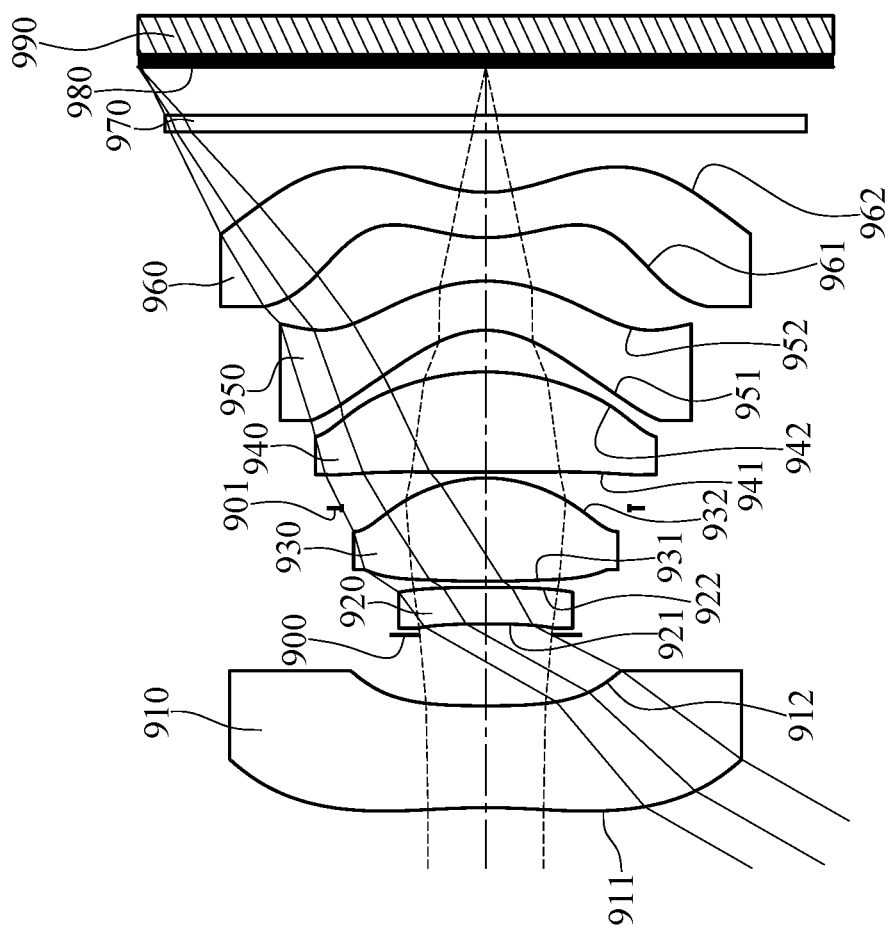
FIG. 17 is a schematic view of an image capturing unit according to the 9th embodiment of the present disclosure.
Figure 18:
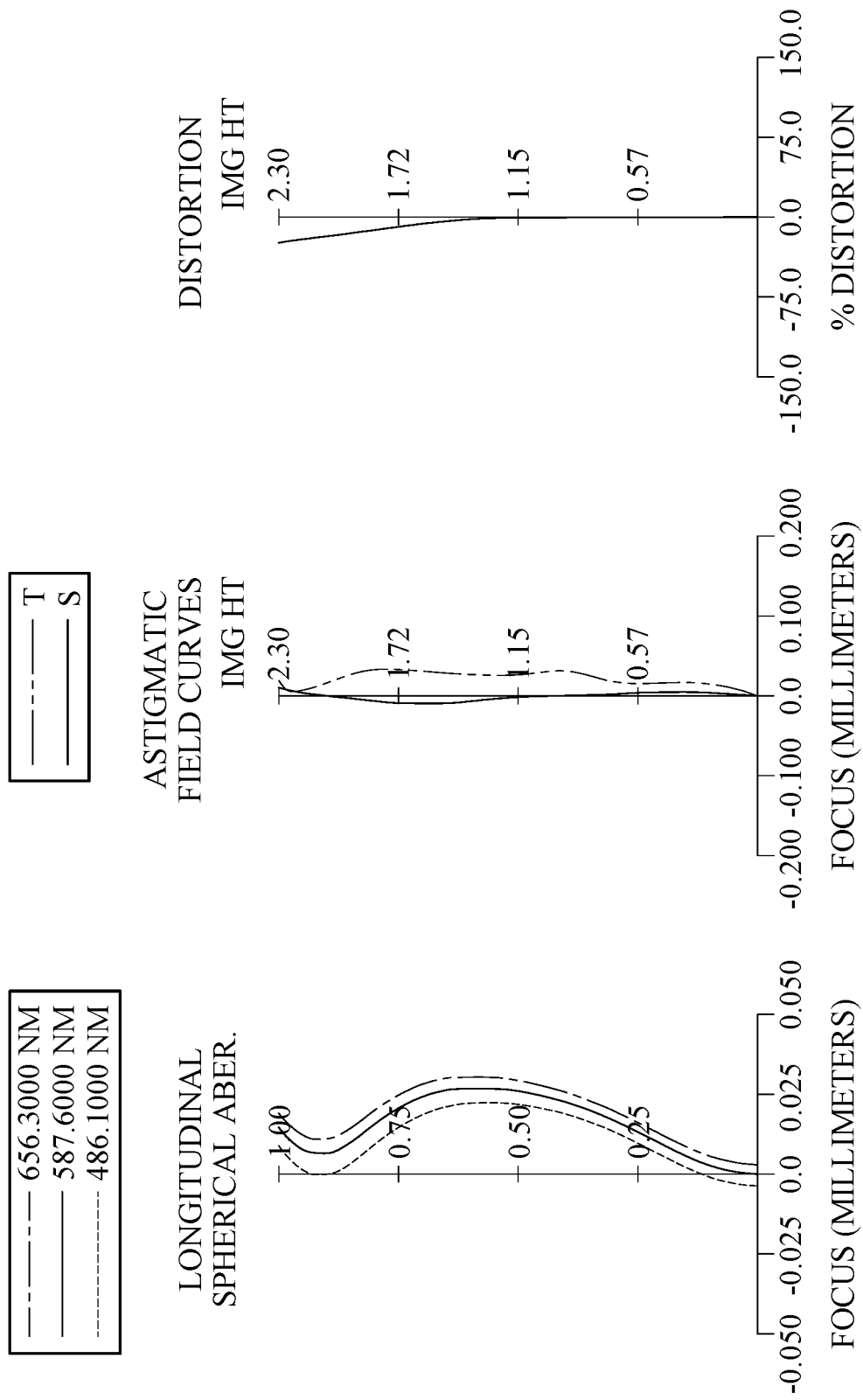
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the optical imaging lens assembly (its reference numeral is omitted) of the present disclosure and an image sensor 990. The optical imaging lens assembly includes, in order from an object side to an image side, a first lens element 910, an aperture stop 900, a second lens element 920, a third lens element 930, a stop 901, a fourth lens element 940, a fifth lens element 950, a sixth lens element 960, an IR-cut filter 970 and an image surface 980. The optical imaging lens assembly includes six lens elements (910, 920, 930, 940, 950 and 960) with no additional lens element disposed between each of the adjacent six lens elements.

The first lens element 910 with negative refractive power has an object-side surface 911 being concave in a paraxial region thereof and an image-side surface 912 being concave in a paraxial region thereof. The first lens element 910 is made of plastic material and has the object-side surface 911 and the image-side surface 912 being both aspheric.

The second lens element 920 with negative refractive power has an object-side surface 921 being concave in a paraxial region thereof and an image-side surface 922 being convex in a paraxial region thereof. The second lens element 920 is made of plastic material and has the object-side surface 921 and the image-side surface 922 being both aspheric.

The third lens element 930 with positive refractive power has an object-side surface 931 being convex in a paraxial region thereof and an image-side surface 932 being convex in a paraxial region thereof. The third lens element 930 is made of plastic material and has the object-side surface 931 and the image-side surface 932 being both aspheric.

In this embodiment, an absolute value of a curvature radius of the object-side surface 951 of the fifth lens element 950 is smaller than the absolute values of the curvature radii of the other lens surfaces of the six lens elements. In detail, the absolute value of the curvature radius of the object-side surface 951 of the fifth lens element 950 is 0.587.

The detailed optical data of the 9th embodiment are shown in Table 17 and the aspheric surface data are shown in Table 18 below.

TABLE 17

9th Embodiment
f = 1.76 mm, Fno = 2.30, HFOV = 60.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −4.377 | (ASP) | 0.674 | Plastic | 1.534 | 55.9 | −5.63 |
| 2 | | 10.087 | (ASP) | 0.468 | | | | |
| 3 | Ape. Stop | Plano | | 0.074 | | | | |
| 4 | Lens 2 | −6.809 | (ASP) | 0.241 | Plastic | 1.669 | 19.5 | −17.67 |
| 5 | | −16.288 | (ASP) | 0.040 | | | | |
| 6 | Lens 3 | 6.437 | (ASP) | 0.683 | Plastic | 1.544 | 56.0 | 1.60 |
| 7 | | −0.972 | (ASP) | −0.200 | | | | |
| 8 | Stop | Plano | | 0.240 | | | | |
| 9 | Lens 4 | −121.662 | (ASP) | 0.662 | Plastic | 1.544 | 56.0 | 3.05 |
| 10 | | −1.642 | (ASP) | 0.276 | | | | |
| 11 | Lens 5 | −0.587 | (ASP) | 0.325 | Plastic | 1.669 | 19.5 | −2.80 |
| 12 | | −1.044 | (ASP) | 0.287 | | | | |
| 13 | Lens 6 | 1.073 | (ASP) | 0.300 | Plastic | 1.660 | 20.4 | −62.24 |
| 14 | | 0.929 | (ASP) | 0.400 | | | | |
| 15 | IR-cut filter | Plano | | 0.110 | Glass | 1.517 | 64.2 | — |
| 16 | | Plano | | 0.319 | | | | |
| 17 | Image | Plano | | — | | | | |

Note:
Reference wavelength is 587.6 nm (d-line).
An effective radius of the stop 901 (Surface 8) is 0.950 mm.

The fourth lens element 940 with positive refractive power has an object-side surface 941 being concave in a paraxial region thereof and an image-side surface 942 being convex in a paraxial region thereof. The fourth lens element 940 is made of plastic material and has the object-side surface 941 and the image-side surface 942 being both aspheric.

The fifth lens element 950 with negative refractive power has an object-side surface 951 being concave in a paraxial region thereof and an image-side surface 952 being convex in a paraxial region thereof. The fifth lens element 950 is made of plastic material and has the object-side surface 951 and the image-side surface 952 being both aspheric. The image-side surface 952 of the fifth lens element 950 has at least one concave critical point in an off-axis region thereof.

The sixth lens element 960 with negative refractive power has an object-side surface 961 being convex in a paraxial region thereof and an image-side surface 962 being concave in a paraxial region thereof. The sixth lens element 960 is made of plastic material and has the object-side surface 961 and the image-side surface 962 being both aspheric. Each of the object-side surface 961 and the image-side surface 962 of the sixth lens element 960 has at least one critical point in an off-axis region thereof.

The IR-cut filter 970 is made of glass material and located between the sixth lens element 960 and the image surface 980, and will not affect the focal length of the optical imaging lens assembly. The image sensor 990 is disposed on or near the image surface 980 of the optical imaging lens assembly.

TABLE 18

| Aspheric Coefficients | | | |
|---|---|---|---|
| Surface # | 1 | 2 | 4 |
| k = | 4.5993E+00 | 8.6367E+01 | −7.8745E+01 |
| A4 = | 1.9398E−01 | 4.1660E−01 | −3.5101E−01 |
| A6 = | −1.2499E−01 | −8.9810E−01 | 1.6706E+00 |
| A8 = | 7.9905E−02 | 3.6554E+00 | −3.0538E+01 |
| A10 = | −3.4591E−02 | −1.0124E+01 | 2.6641E+02 |
| A12 = | 9.7709E−03 | 1.7038E+01 | −1.2906E+03 |
| A14 = | −1.5355E−03 | −1.4766E+01 | 3.1693E+03 |
| A16 = | 1.0047E−04 | 4.9090E+00 | −3.3296E+03 |
| Surface # | 5 | 6 | 7 |
| k = | 5.1819E+01 | 4.3596E+01 | −3.5952E−01 |
| A4 = | −1.3190E−01 | −7.1019E−02 | 8.7356E−02 |
| A6 = | −1.4466E+00 | −1.1054E+00 | 1.8912E−01 |
| A8 = | 7.5809E+00 | 5.9078E+00 | −2.7339E+00 |
| A10 = | −6.1157E+00 | −9.3006E+00 | 8.9196E+00 |
| A12 = | −5.0550E+01 | 2.9644E+00 | −1.5318E+01 |
| A14 = | 1.4500E+02 | 6.0485E+00 | 1.5975E+01 |
| A16 = | −1.2990E+02 | −4.6405E+00 | −6.8629E+00 |
| Surface # | 9 | 10 | 11 |
| k = | −8.8437E+01 | −1.3418E+00 | −1.6205E+00 |
| A4 = | 6.3764E−02 | −4.6683E−02 | 3.7142E−01 |
| A6 = | −8.6371E−02 | −3.8595E−01 | −1.7434E+00 |
| A8 = | −3.4406E−01 | 2.4630E+00 | 5.6606E+00 |
| A10 = | 6.4314E−01 | −5.4965E+00 | −9.4224E+00 |

TABLE 18-continued

| Aspheric Coefficients | | | |
|---|---|---|---|
| A12 = | −1.9612E−01 | 5.4777E+00 | 8.2432E+00 |
| A14 = | −2.1771E−01 | −2.5112E+00 | −3.6241E+00 |
| A16 = | 1.2319E−01 | 4.3721E−01 | 6.3296E−01 |
| Surface # | 12 | 13 | 14 |
| k = | −8.8484E−01 | −1.3922E+00 | −9.5905E−01 |
| A4 = | 2.4637E−01 | −6.4745E−01 | −5.5862E−01 |
| A6 = | −4.6967E−01 | 3.6470E−01 | 1.7560E−01 |
| A8 = | 7.3178E−01 | −1.0781E+00 | 4.5090E−02 |
| A10 = | −3.9754E−01 | 1.4044E+00 | −8.0645E−02 |
| A12 = | 4.5865E−02 | −7.7629E−01 | 3.7678E−02 |
| A14 = | 2.3847E−02 | 1.9838E−01 | −7.9595E−03 |
| A16 = | −5.7013E−03 | −1.9465E−02 | 6.4499E−04 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 1.76 | f/R10 | −1.68 |
| Fno | 2.30 | f/R12 | 1.89 |
| HFOV [deg.] | 60.2 | \|R11/CT6\| + \|R12/CT6\| | 6.67 |
| FOV [deg.] | 120.4 | CT2/CT3 | 0.35 |
| V5 + V6 | 39.85 | ΣAT/T12 | 2.19 |
| (R5 + R6)/(R5 − R6) | 0.74 | Yc61/Yc62 | 0.70 |
| \|f/R3\| + \|f/R4\| | 0.37 | — | — |

10th Embodiment

Figure 19:
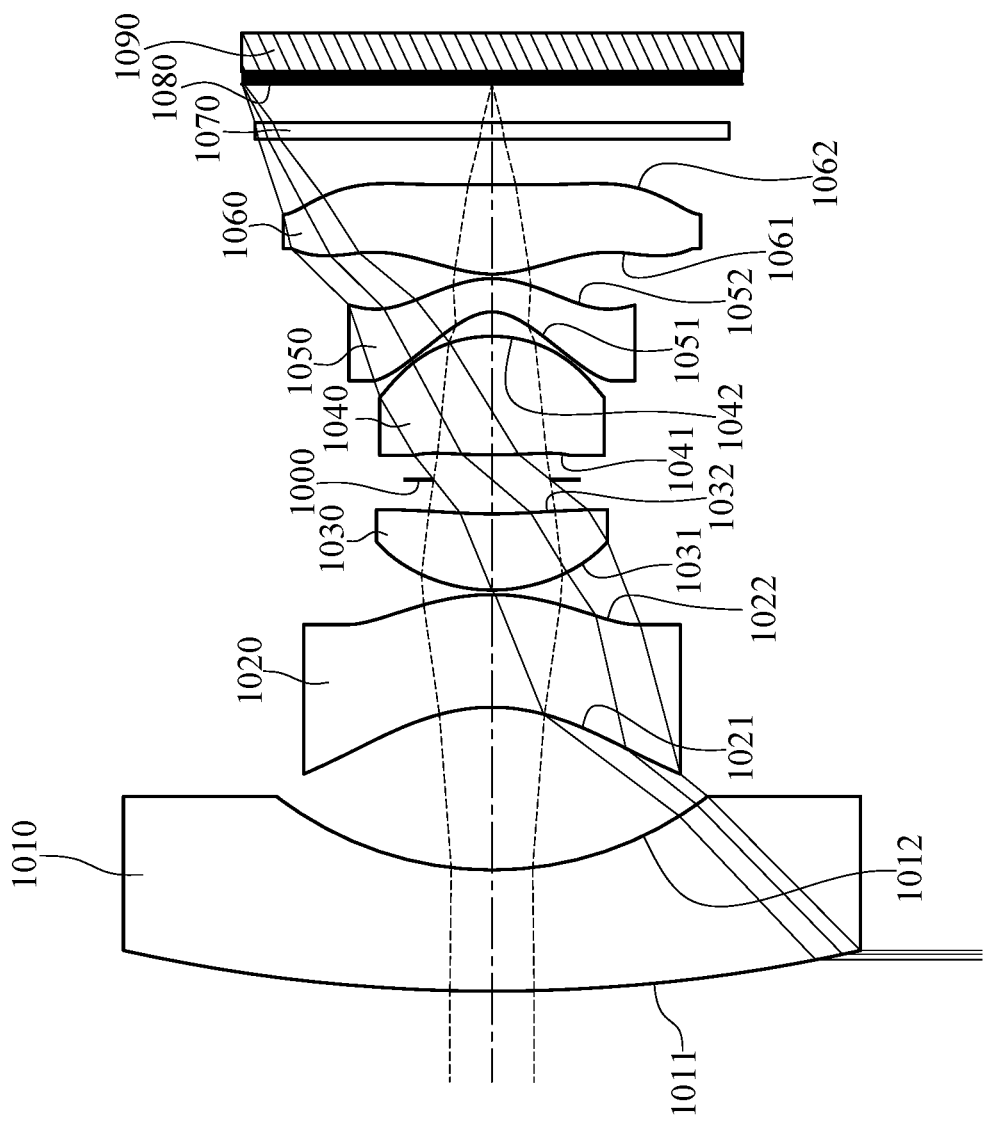
FIG. 19 is a schematic view of an image capturing unit according to the 10th embodiment of the present disclosure.
Figure 20:
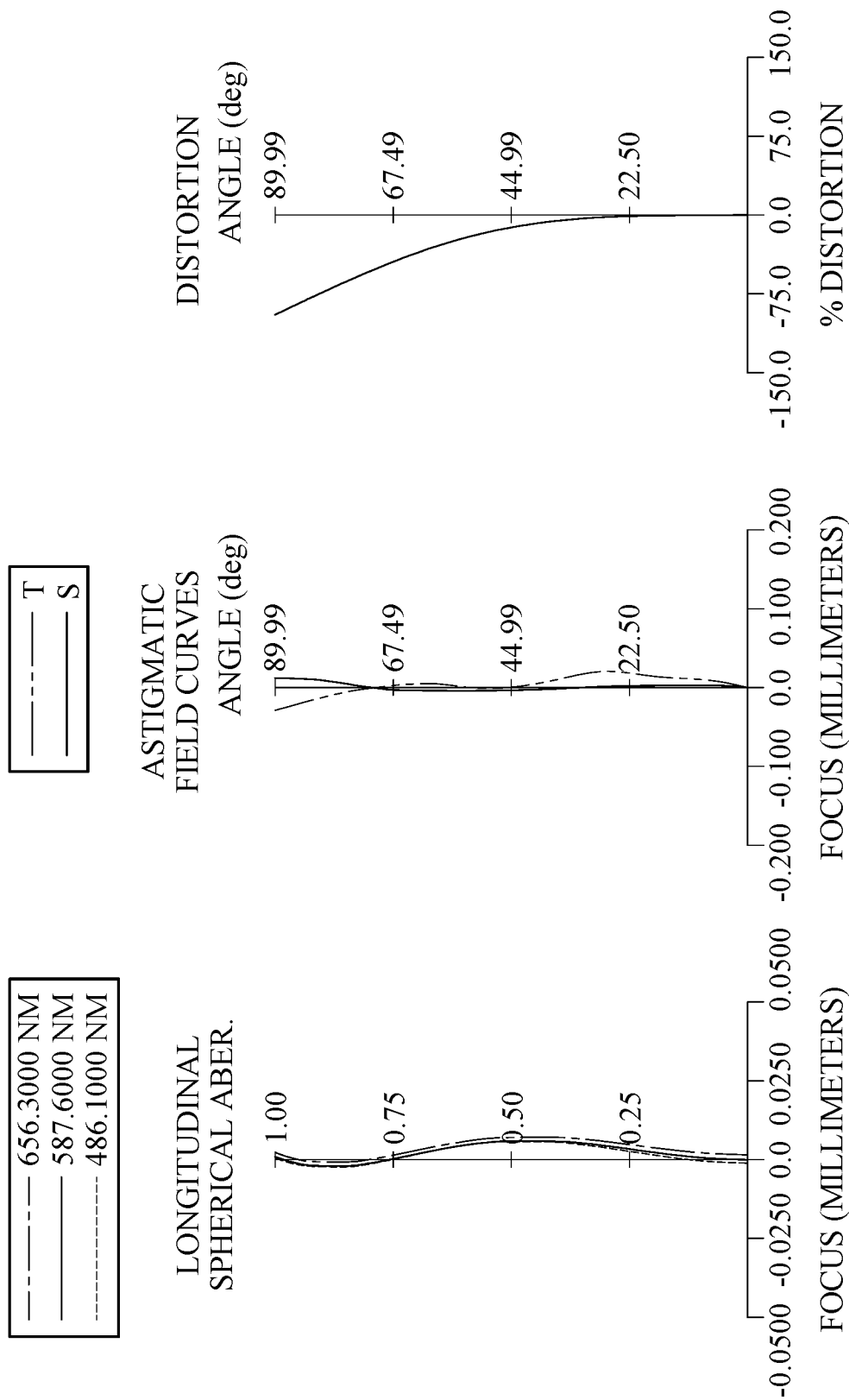
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the optical imaging lens assembly (its reference numeral is omitted) of the present disclosure and an image sensor 1090. The optical imaging lens assembly includes, in order from an object side to an image side, a first lens element 1010, a second lens element 1020, a third lens element 1030, an aperture stop 1000, a fourth lens element 1040, a fifth lens element 1050, a sixth lens element 1060, an IR-cut filter 1070 and an image surface 1080. The optical imaging lens assembly includes six lens elements (1010, 1020, 1030, 1040, 1050 and 1060) with no additional lens element disposed between each of the adjacent six lens elements.

The first lens element 1010 with negative refractive power has an object-side surface 1011 being convex in a paraxial region thereof and an image-side surface 1012 being concave in a paraxial region thereof. The first lens element 1010 is made of glass material and has the object-side surface 1011 and the image-side surface 1012 being both spherical.

The second lens element 1020 with positive refractive power has an object-side surface 1021 being concave in a paraxial region thereof and an image-side surface 1022 being convex in a paraxial region thereof. The second lens element 1020 is made of plastic material and has the object-side surface 1021 and the image-side surface 1022 being both aspheric.

The third lens element 1030 with positive refractive power has an object-side surface 1031 being convex in a paraxial region thereof and an image-side surface 1032 being concave in a paraxial region thereof. The third lens element 1030 is made of plastic material and has the object-side surface 1031 and the image-side surface 1032 being both aspheric.

The fourth lens element 1040 with positive refractive power has an object-side surface 1041 being convex in a paraxial region thereof and an image-side surface 1042 being convex in a paraxial region thereof. The fourth lens element 1040 is made of plastic material and has the object-side surface 1041 and the image-side surface 1042 being both aspheric.

The fifth lens element 1050 with negative refractive power has an object-side surface 1051 being concave in a paraxial region thereof and an image-side surface 1052 being convex in a paraxial region thereof. The fifth lens element 1050 is made of plastic material and has the object-side surface 1051 and the image-side surface 1052 being both aspheric. The image-side surface 1052 of the fifth lens element 1050 has at least one concave critical point in an off-axis region thereof.

The sixth lens element 1060 with positive refractive power has an object-side surface 1061 being convex in a paraxial region thereof and an image-side surface 1062 being convex in a paraxial region thereof. The sixth lens element 1060 is made of plastic material and has the object-side surface 1061 and the image-side surface 1062 being both aspheric. Each of the object-side surface 1061 and the image-side surface 1062 of the sixth lens element 1060 has at least one critical point in an off-axis region thereof.

The IR-cut filter 1070 is made of glass material and located between the sixth lens element 1060 and the image surface 1080, and will not affect the focal length of the optical imaging lens assembly. The image sensor 1090 is disposed on or near the image surface 1080 of the optical imaging lens assembly.

In this embodiment, an absolute value of a curvature radius of the object-side surface 1051 of the fifth lens element 1050 is smaller than the absolute values of the curvature radii of the other lens surfaces of the six lens elements. In detail, the absolute value of the curvature radius of the object-side surface 1051 of the fifth lens element 1050 is 0.260.

The detailed optical data of the 10th embodiment are shown in Table 19 and the aspheric surface data are shown in Table 20 below.

TABLE 19

10th Embodiment
f = 1.13 mm, Fno = 2.04, HFOV = 90.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 11.134 | | 0.800 | Glass | 1.835 | 42.7 | −3.67 |
| 2 | | 2.326 | | 1.078 | | | | |
| 3 | Lens 2 | −1.233 | (ASP) | 0.745 | Plastic | 1.544 | 56.0 | 39.32 |
| 4 | | −1.414 | (ASP) | 0.030 | | | | |
| 5 | Lens 3 | 1.085 | (ASP) | 0.504 | Plastic | 1.544 | 56.0 | 2.73 |
| 6 | | 3.364 | (ASP) | 0.226 | | | | |
| 7 | Ape. Stop | Plano | | 0.164 | | | | |
| 8 | Lens 4 | 3.419 | (ASP) | 0.785 | Plastic | 1.544 | 56.0 | 1.37 |
| 9 | | −0.873 | (ASP) | 0.161 | | | | |
| 10 | Lens 5 | −0.260 | (ASP) | 0.220 | Plastic | 1.660 | 20.4 | −0.89 |
| 11 | | −0.626 | (ASP) | 0.030 | | | | |
| 12 | Lens 6 | 0.700 | (ASP) | 0.593 | Plastic | 1.544 | 56.0 | 1.24 |
| 13 | | −12.554 | (ASP) | 0.300 | | | | |
| 14 | IR-cut filter | Plano | | 0.110 | Glass | 1.517 | 64.2 | — |
| 15 | | Plano | | 0.253 | | | | |
| 16 | Image | Plano | | — | | | | |

Note:
Reference wavelength is 587.6 nm (d-line).
An effective radius of the image-side surface 1012 (Surface 2) is 1.425 mm.

TABLE 20

Aspheric Coefficients

| Surface # | 3 | 4 | 5 | 6 | 8 |
|---|---|---|---|---|---|
| k = | −4.6321E+00 | 5.4783E−01 | −1.6227E+00 | 1.5294E+01 | 1.1953E+01 |
| A4 = | −1.4889E−01 | 1.5996E−01 | 7.3616E−02 | −3.6357E−01 | −4.3165E−01 |
| A6 = | 1.5271E−01 | 1.0213E−01 | 2.9189E−01 | 2.1755E−01 | 2.5459E−01 |
| A8 = | −5.0938E−02 | −6.7030E−02 | −4.3527E−01 | −1.0590E−02 | −5.1646E+00 |
| A10 = | 2.3247E−03 | 8.7923E−02 | 5.6406E−01 | — | 3.9133E+00 |
| A12 = | 1.1904E−03 | — | — | — | — |

| Surface # | 9 | 10 | 11 | 12 | 13 |
|---|---|---|---|---|---|
| k = | −4.2613E−01 | −2.4738E+00 | −7.0257E+00 | −7.3842E+00 | 7.6416E+01 |
| A4 = | 1.4450E−01 | −1.1205E+00 | −8.4752E−01 | −3.0535E−01 | 2.8911E−01 |
| A6 = | −3.3941E+00 | 5.6773E+00 | 3.8546E+00 | 8.0081E−01 | −3.9262E−01 |
| A8 = | 1.5695E+01 | −1.1709E+01 | −7.4006E+00 | −2.2391E+00 | −7.6365E−02 |
| A10 = | −3.8033E+01 | 9.9224E+00 | 8.8619E+00 | 2.9446E+00 | 4.1754E−01 |
| A12 = | 4.4064E+01 | 3.0705E+00 | −5.9093E+00 | −1.9125E+00 | −3.1574E−01 |
| A14 = | −1.7759E+01 | −6.7744E+00 | 1.5923E+00 | 6.1540E−01 | 1.0063E−01 |
| A16 = | — | — | — | −7.8936E−02 | −1.1278E−02 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 1.13 | f/R10 | −1.81 |
| Fno | 2.04 | f/R12 | −0.09 |
| HFOV [deg.] | 90.0 | |R11/CT6| + |R12/CT6| | 22.35 |
| FOV [deg.] | 180.0 | CT2/CT3 | 1.48 |

-continued

| 10th Embodiment | | | |
|---|---|---|---|
| V5 + V6 | 76.38 | ΣAT/T12 | 1.57 |
| (R5 + R6)/(R5 − R6) | −1.95 | Yc61/Yc62 | 1.14 |
| |f/R3| + |f/R4| | 1.72 | — | — |

11th Embodiment

Figure 21:
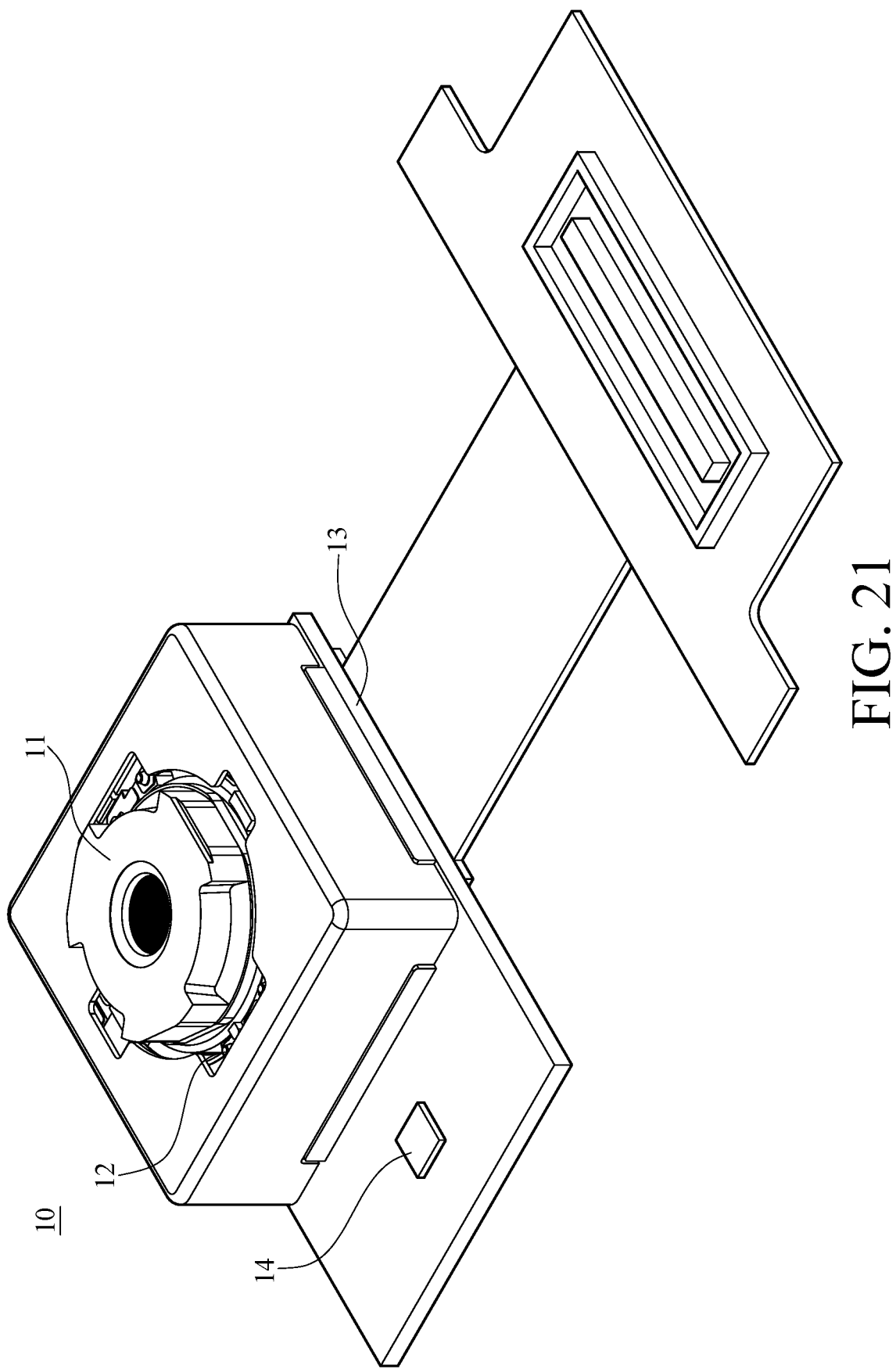
FIG. 21 is a perspective view of an image capturing unit according to the 11th embodiment of the present disclosure.

FIG. 21 is a perspective view of an image capturing unit according to the 11th embodiment of the present disclosure. In this embodiment, an image capturing unit 10 is a camera module including a lens unit 11, a driving device 12, an image sensor 13 and an image stabilizer 14. The lens unit 11 includes the optical imaging lens assembly disclosed in the 1st embodiment, a barrel and a holder member (their reference numerals are omitted) for holding the optical imaging lens assembly. The imaging light converges in the lens unit 11 of the image capturing unit 10 to generate an image while utilizing the driving device 12 for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the optical imaging lens assembly to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving the image quality while in motion or low-light conditions.

12th Embodiment

Figure 22:
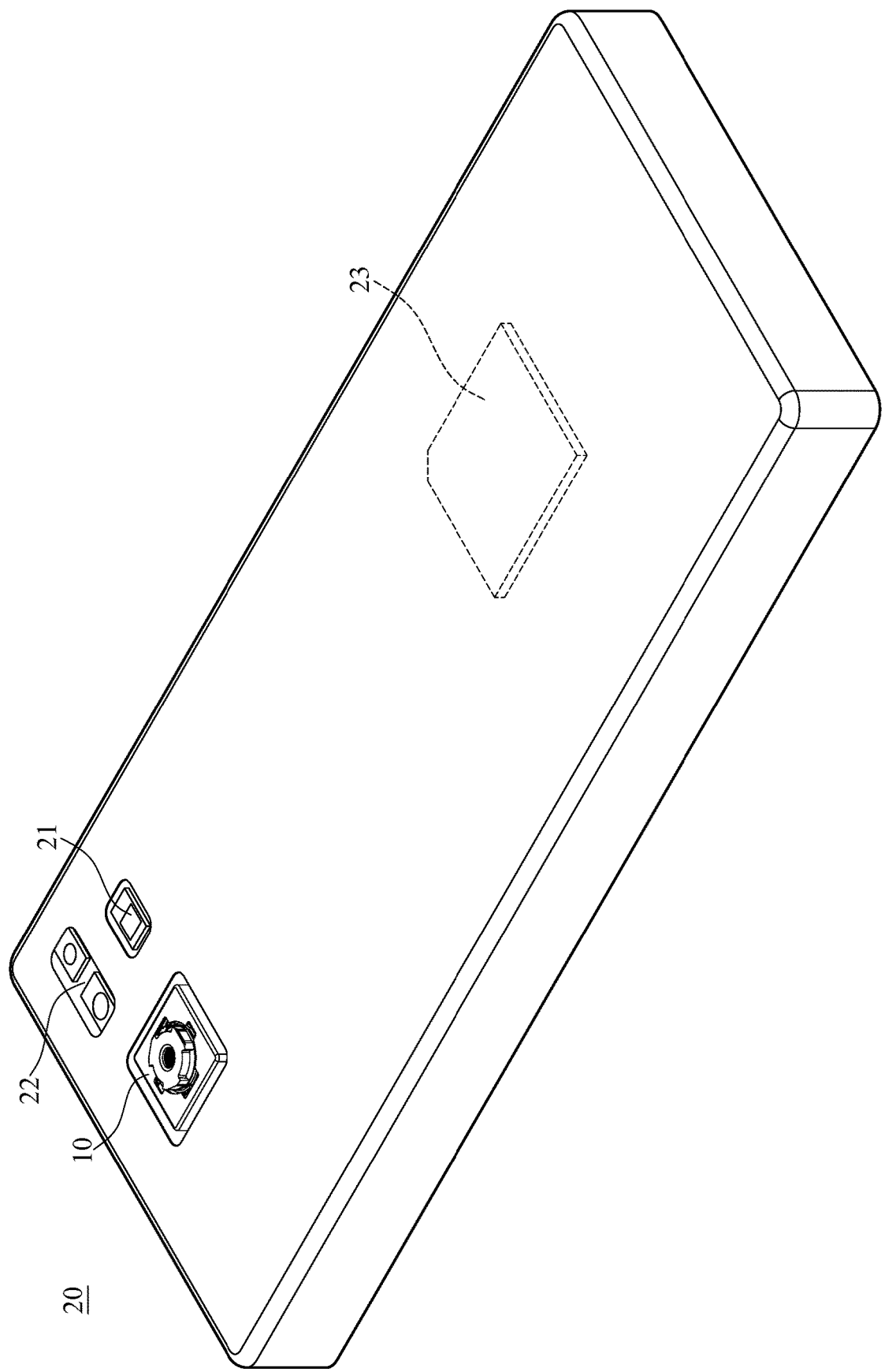
FIG. 22 is one perspective view of an electronic device according to the 12th embodiment of the present disclosure.
Figure 23:
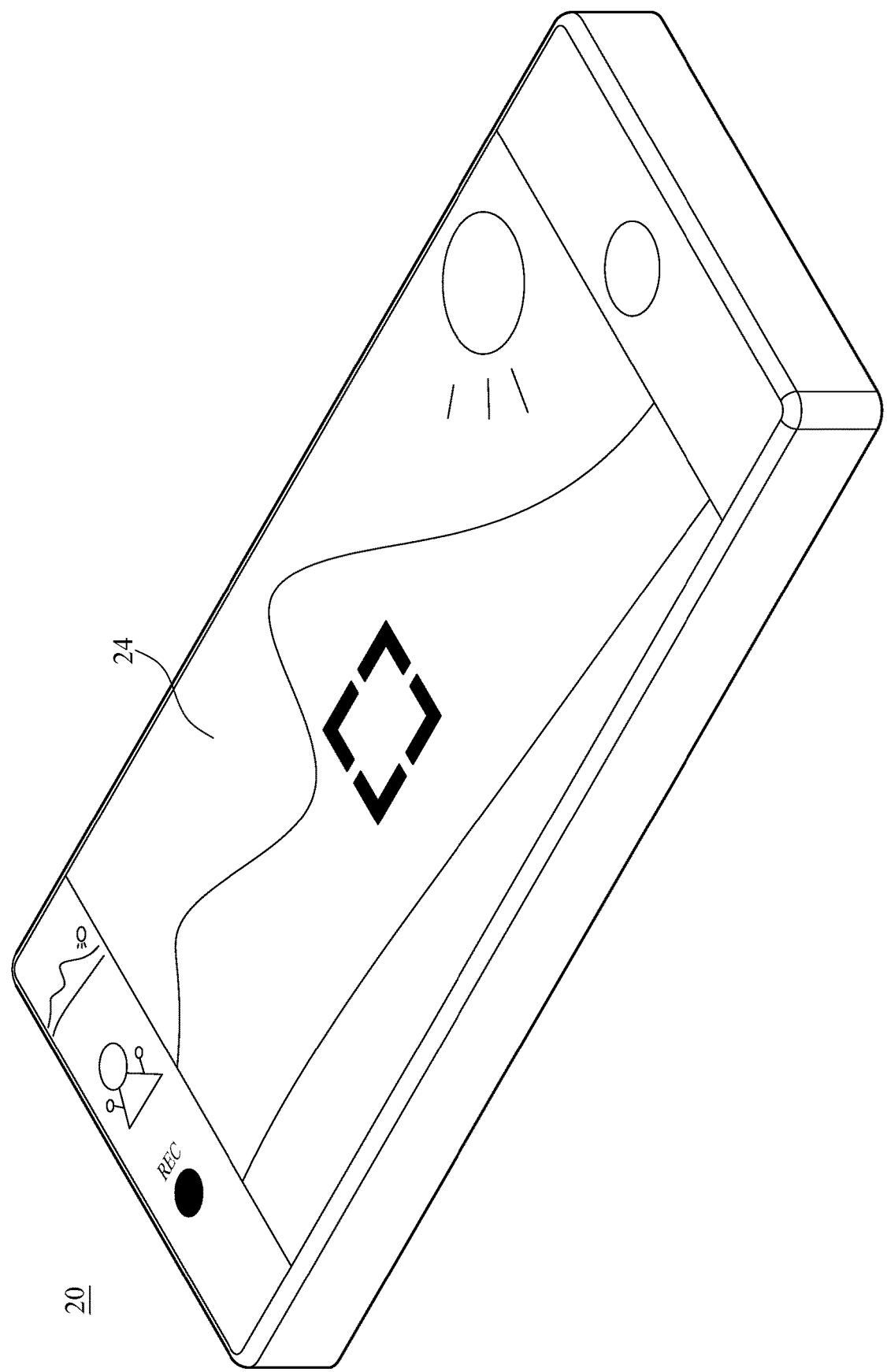
FIG. 23 is another perspective view of the electronic device in FIG. 22.
Figure 24:
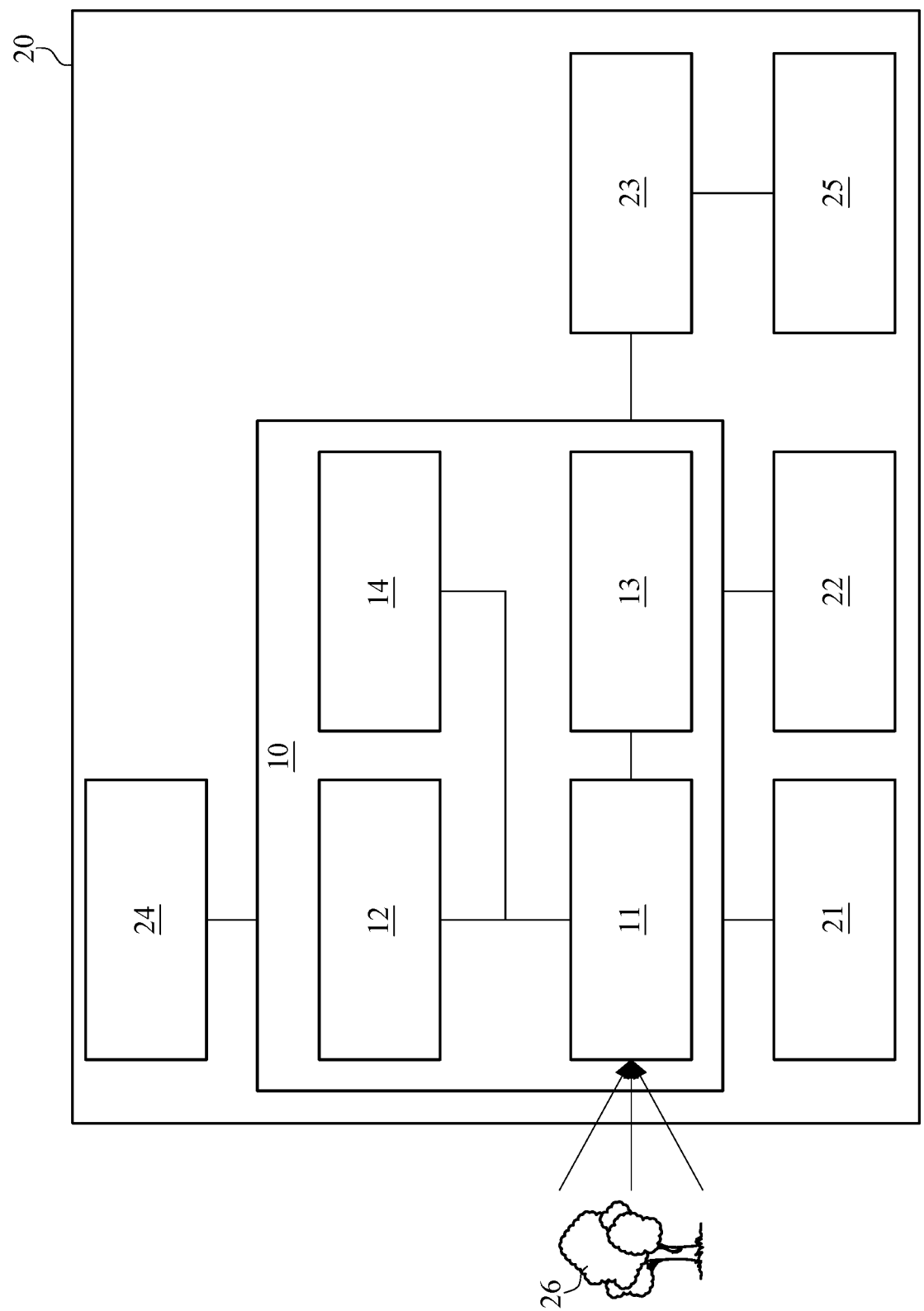
FIG. 24 is a block diagram of the electronic device in FIG. 22.

FIG. 22 is one perspective view of an electronic device according to the 12th embodiment of the present disclosure. FIG. 23 is another perspective view of the electronic device in FIG. 22. FIG. 24 is a block diagram of the electronic device in FIG. 22. In this embodiment, an electronic device 20 is a smartphone including the image capturing unit 10 disclosed in the 11th embodiment, a flash module 21, a focus assist module 22, an image signal processor 23, a user interface 24 and an image software processor 25. In this embodiment, the electronic device 20 includes one image capturing unit 10, but the disclosure is not limited thereto. In some cases, the electronic device 20 can include multiple image capturing units 10, or the electronic device 20 further includes another different image capturing unit.

When a user captures images of an object 26 through the user interface 24, the light rays converge in the image capturing unit 10 to generate an image, and the flash module 21 is activated for light supplement. The focus assist module 22 detects the object distance of the imaged object 26 to achieve fast auto focusing.

The image signal processor 23 is configured to optimize the captured image to improve the image quality. The light beam emitted from the focus assist module 22 can be either conventional infrared or laser. The user interface 24 can be a touch screen or a physical button. The user is able to interact with the user interface 24 and the image software processor 25 having multiple functions to capture images and complete image processing.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the optical imaging lens assembly of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-20 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging lens assembly comprising six lens elements, the six lens elements being, in order from an object side to an image side, a first lens element, a second lens element, a third lens element, a fourth lens element, a fifth lens element and a sixth lens element; the first lens element having negative refractive power, the second lens element having an object-side surface being concave in a paraxial region thereof and an image-side surface being convex in a paraxial region thereof, the third lens element having an object-side surface being convex in a paraxial region thereof, the fifth lens element with negative refractive power having an object-side surface being concave in a paraxial region thereof and an image-side surface being convex in a paraxial region thereof, the sixth lens element having an image-side surface being concave in a paraxial region thereof, at least one of an object-side surface and the image-side surface of the sixth lens element having at least one critical point in an off-axis region thereof, and the object-side surface and the image-side surface of the sixth lens element being both aspheric;

wherein a curvature radius of the object-side surface of the third lens element is R5, a curvature radius of an image-side surface of the third lens element is R6, a focal length of the optical imaging lens assembly is f, a curvature radius of the image-side surface of the sixth lens element is R12, a vertical distance between a non-axial critical point on the object-side surface of the sixth lens element and an optical axis is Yc61, a vertical distance between a non-axial critical point on the image-side surface of the sixth lens element and the optical axis is Yc62, and the following conditions are satisfied:

$(R5+R6)/(R5-R6)<0.20;$ $0.75<f/R12;$ and $0.50<Yc61/Yc62<2.0.$

2. The optical imaging lens assembly of claim 1, wherein an f-number of the optical imaging lens assembly is Fno, a maximum field of view of the optical imaging lens assembly is FOV, and the following conditions are satisfied:

$1.20<Fno<2.40;$ and $110 \text{ [deg.]}<FOV<220 \text{ [deg.]}.$

3. The optical imaging lens assembly of claim 1, wherein a sum of axial distances between each of all adjacent lens elements of the optical imaging lens assembly is ΣAT, an axial distance between the first lens element and the second lens element is T12, and the following condition is satisfied:

1.0<ΣAT/T12<2.0.

4. The optical imaging lens assembly of claim 1, wherein the focal length of the optical imaging lens assembly is f, a curvature radius of an object-side surface of the second lens element is R3, a curvature radius of an image-side surface of the second lens element is R4, and the following condition is satisfied:

0.60<|f/R3|+|f/R4|<3.0.

5. The optical imaging lens assembly of claim 1, wherein a central thickness of the second lens element is CT2, a central thickness of the third lens element is CT3, and the following condition is satisfied:

1.0<CT2/CT3.

6. The optical imaging lens assembly of claim 1, wherein an Abbe number of the fifth lens element is V5, an Abbe number of the sixth lens element is V6, and the following condition is satisfied:

V5+V6<65.

7. The optical imaging lens assembly of claim 1, wherein a curvature radius of the object-side surface of the sixth lens element is R11, the curvature radius of the image-side surface of the sixth lens element is R12, a central thickness of the sixth lens element is CT6, and the following condition is satisfied:

|R11/CT6|+|R12/CT6|<10.

8. The optical imaging lens assembly of claim 1, wherein the third lens element has positive refractive power, the curvature radius of the object-side surface of the third lens element is R5, the curvature radius of the image-side surface of the third lens element is R6, and the following condition is satisfied:

−4.5<(R5+R6)/(R5−R6)<−0.40.

9. The optical imaging lens assembly of claim 1, wherein the fourth lens element with positive refractive power has an object-side surface being convex in a paraxial region thereof and an image-side surface being convex in a paraxial region thereof.

10. The optical imaging lens assembly of claim 1, wherein the image-side surface of the fifth lens element has at least one concave critical point in an off-axis region thereof.

11. An image capturing unit, comprising:
the optical imaging lens assembly of claim 1; and
an image sensor disposed on an image surface of the optical imaging lens assembly.

12. An electronic device, comprising:
the image capturing unit of claim 11.

13. An optical imaging lens assembly comprising six lens elements, the six lens elements being, in order from an object side to an image side, a first lens element, a second lens element, a third lens element, a fourth lens element, a fifth lens element and a sixth lens element; the first lens element having negative refractive power, the second lens element having an object-side surface being concave in a paraxial region thereof, the third lens element having an object-side surface being convex in a paraxial region thereof and an image-side surface being concave in a paraxial region thereof, the fifth lens having negative refractive power, the sixth lens element having an image-side surface being concave in a paraxial region thereof, at least one of an object-side surface and the image-side surface of the sixth lens element having at least one critical point in an off-axis region thereof, and the object-side surface and the image-side surface of the sixth lens element being both aspheric;
wherein a focal length of the optical imaging lens assembly is f, a curvature radius of the image-side surface of the sixth lens element is R12, a vertical distance between a non-axial critical point on the object-side surface of the sixth lens element and an optical axis is Yc61, a vertical distance between a non-axial critical point on the image-side surface of the sixth lens element and the optical axis is Yc62, and the following conditions are satisfied:

0.75<f/R12; and 0.50<Yc61/Yc62<2.0.

14. The optical imaging lens assembly of claim 13, wherein a sum of axial distances between each of all adjacent lens elements of the optical imaging lens assembly is ΣAT, an axial distance between the first lens element and the second lens element is T12, and the following condition is satisfied:

1.0<ΣAT/T12<2.0.

15. The optical imaging lens assembly of claim 13, wherein a central thickness of the second lens element is CT2, a central thickness of the third lens element is CT3, and the following condition is satisfied:

1.0<CT2/CT3.

16. The optical imaging lens assembly of claim 13, wherein a curvature radius of the object-side surface of the third lens element is R5, a curvature radius of the image-side surface of the third lens element is R6, and the following condition is satisfied:

−3.0<(R5+R6)/(R5−R6)<−1.0.

17. The optical imaging lens assembly of claim 13, wherein the image-side surface of the third lens element has at least one convex critical point in an off-axis region thereof.

18. The optical imaging lens assembly of claim 13, wherein an absolute value of a curvature radius of an object-side surface of the fifth lens element is a minimum among absolute values of curvature radii of all lens surfaces of the six lens elements.

19. The optical imaging lens assembly of claim 13, wherein an image-side surface of the fifth lens element has at least one concave critical point in an off-axis region thereof.

* * * * *